US009407336B2

(12) United States Patent
Seol et al.

(10) Patent No.: US 9,407,336 B2
(45) Date of Patent: Aug. 2, 2016

(54) APPARATUS AND METHOD FOR BEAMFORMING GAIN DIFFERENCE COMPENSATION ACCORDING TO CHANGE OF TRANSMITTING AND RECEIVING BEAM PATTERN IN BEAMFORMING BASED WIRELESS COMMUNICATION SYSTEM

(71) Applicant: Samsung Electronics Co., Ltd, Gyeonggi-do (KR)

(72) Inventors: Ji-Yun Seol, Gyeonggi-do (KR); Tae-Young Kim, Gyeonggi-do (KR); Hyun-Kyu Yu, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 128 days.

(21) Appl. No.: 14/089,614

(22) Filed: Nov. 25, 2013

(65) Prior Publication Data
US 2014/0146863 A1    May 29, 2014

(30) Foreign Application Priority Data

Nov. 23, 2012  (KR) ........................ 10-2012-0133760

(51) Int. Cl.
*H04M 1/00* (2006.01)
*H04B 7/04* (2006.01)
*H04B 7/06* (2006.01)
*H04B 7/08* (2006.01)

(52) U.S. Cl.
CPC ............ *H04B 7/0408* (2013.01); *H04B 7/0456* (2013.01); *H04B 7/0617* (2013.01); *H04B 7/086* (2013.01)

(58) Field of Classification Search
None
See application file for complete search history.

(56) References Cited

U.S. PATENT DOCUMENTS

| 2008/0051150 | A1 | 2/2008 | Tsutsui |
| 2009/0046003 | A1 | 2/2009 | Tung et al. |
| 2010/0151795 | A1 | 6/2010 | Lee |
| 2010/0273499 | A1 | 10/2010 | van Rensburg et al. |
| 2011/0176502 | A1* | 7/2011 | Chung ................ H04W 72/042 370/329 |
| 2012/0188976 | A1 | 7/2012 | Kim et al. |

FOREIGN PATENT DOCUMENTS

| CN | 101841847 | 9/2010 |
| KR | 10-2009-0085405 | 8/2009 |
| WO | WO 2012/116486 A1 | 9/2012 |

OTHER PUBLICATIONS

International Search Report dated Feb. 24, 2014 in connection with International Application No. PCT/KR2013/010726, 3 pages.
Written Opinion of the International Searching Authority dated Feb. 24, 2014 in connection with International Application No. PCT/KR2013/010726, 5 pages.

(Continued)

*Primary Examiner* — Suhail Khan

(57) ABSTRACT

A method of operating a Mobile Station (MS) in a wireless communication system using beamforming includes receiving a reference signal over a plurality of downlink transmit (Tx) beams, measuring channel quality information of the received reference signal, and generating effective channel quality information by compensating for beamforming gain compensation information according to the channel quality information.

14 Claims, 17 Drawing Sheets

(56) References Cited

OTHER PUBLICATIONS

Han Sang Yoon et al., "MCS Level Selection Algorithm by Considering Beamforming Gain According to Mobile Velocity in WiMAX System", The Fall Conference 2009, The Korean Institute of Communications and Information Sciences, Nov. 2009, pp. 660-665.

Partial Supplementary European Search Report dated Jun. 22, 2016 in connection with European Application No. 13857249.0, 7 pages.

* cited by examiner

APPARATUS AND METHOD FOR BEAMFORMING GAIN DIFFERENCE COMPENSATION ACCORDING TO CHANGE OF TRANSMITTING AND RECEIVING BEAM PATTERN IN BEAMFORMING BASED WIRELESS COMMUNICATION SYSTEM

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Nov. 23, 2012, and assigned Serial No. 10-2012-0133760, the entire disclosure of which is hereby incorporated by reference.

TECHNICAL FIELD

The present disclosure relates to analog beamforming, digital beamforming, or hybrid beamforming which combines the analog beamforming and the digital beamforming.

BACKGROUND

Wireless mobile communication systems up to fourth generation transmit and receive control channel and data based on an isotropic or omnidirectional antenna in a frequency band below 1 GHz or between 1~3 GHz. The wireless mobile communication system may support a selective function for allocating some resources to a user who meets a particular channel condition, through digital beamforming. A cellular system conducts research on an additional performance gain by applying a transmit (Tx) diversity and a receive (Rx) diversity such as multipath propagation which naturally generates according to channel characteristics and Multiple Input Multiple Output (MIMO) using multiple transmit/receive antennas.

By contrast, in an ultrahigh frequency such as millimeter wave, the channel characteristics and Tx/Rx beamforming can obtain a beamforming gain by mitigating the channel multipath propagation, but it is difficult to support the Tx/Rx diversity. Hence, researches are limited mostly to a beamforming weight coefficient which optimizes a performance index such as receive Signal-to-Noise Ratio (SNR) by maximizing the beamforming gain when the beamforming is applied. The related art operates the beamforming with an analog array including a plurality of Radio Frequency (RF)/antenna elements based on a single RF path, without supporting the MIMO. In so doing, the beamforming is operated by sweeping a particular beam pattern in several directions and selecting and feeding back one beam of the strongest receive signal in a receiving stage. This is applicable to an indoor environment having Light of Sight (LoS) as a channel path in a proximity distance within several meters without mobility.

In the outdoor wireless communication which is subject to abrupt channel condition change caused by the mobility of tens of km/h, fast rotation of a terminal, or Non-Line-of-Sight (NLos) path characteristics or channel fading due to an obstacle, when the beamforming gain is maximized in a particular direction and the beamforming of narrow bandwidth is operated with directivity, sensitivity can increase due to the considerable performance degradation according to the user environment. By use of the beamforming as discussed above, the wireless communication system can optimize the performance index such as receive SNR by maximizing the beamforming gain.

However, the wireless communication system using the beamforming cannot obtain the diversity gain because the multipath propagation reduces. The terminal mobility or the channel condition and beamforming information mismatch caused by delay until actual beam allocation after the beam is measured/selected can make the performance sensitive to the beamforming. That is, the ultrahigh frequency wireless mobile communication system based on the beamforming is sensitive to the channel fading and the obstacle because of a great propagation loss and a great penetration loss caused by the channel propagation of the ultrahigh frequency band, the small multipath propagation, and strong directivity caused by the beamforming.

Hence, a system may be designed on the assumption that one or more beam patterns having different beamwidths and gains are operated differently by considering the channel condition or the resource characteristics between the data channel and the control channel with different coding gains, between an uplink and a downlink (or between the transmission and the reception), or between a broadcast channel and a unicast channel.

However, when the beam patterns of the different beamwidths and gains are operated, the beamforming gain difference arises in a particular direction according to the trade-off between the beamwidth and the beamforming gain according to the beam patterns.

SUMMARY

To address the above-discussed deficiencies, it is a primary aspect of the present disclosure to provide a method and an apparatus for operating beamforming gain difference compensation according to a Tx/Rx beam pattern change in a beamforming based wireless communication system.

Another aspect of the present disclosure is to provide a method and an apparatus for effectively operating beamforming by considering a beamforming gain difference based on different Tx/Rx beam patterns in a beamforming based system which transmits and receives uplink/downlink in one or more beam patterns with different beamwidths and beamforming gains.

According to one aspect of the present disclosure, an operating method of a Mobile Station (MS) in a wireless communication system using beamforming includes receiving a reference signal over a plurality of downlink transmit (Tx) beams; measuring channel quality information of the received reference signal; and generating effective channel quality information by compensating for beamforming gain compensation information according to the channel quality information. The channel quality information or the effective channel quality information may include channel quality information such as Carrier to Interference and Noise Ratio (CINR) and Received Signal Strength Indicator (RSSI), or effective channel quality information such as supportable MCS level estimated from post-processing CINR or CINR.

According to another aspect of the present disclosure, an operating method of a Base Station (BS) in a wireless communication system using beamforming includes transmitting a reference signal using a plurality of downlink Tx beams; and receiving effective channel quality information in response to the transmitted reference signal. The effective channel quality information is generated by an MS by compensating for receive (Rx) channel quality information for the transmitted reference signal according to beamforming gain compensation information.

According to yet another aspect of the present disclosure, an apparatus of an MS in a wireless communication system using beamforming includes a receiver for receiving a reference signal over a plurality of downlink Tx beams; and a controller for measuring channel quality information of the received reference signal, and generating effective channel quality information by compensating for beamforming gain compensation information according to the channel quality information.

According to still another aspect of the present disclosure, an apparatus of a BS in a wireless communication system using beamforming includes a transmitter for transmitting a reference signal using a plurality of downlink Tx beams; and a receiver for receiving effective channel quality information in response to the transmitted reference signal. The effective channel quality information is generated by an MS by compensating for Rx channel quality information for the transmitted reference signal according to beamforming gain compensation information.

According to a further aspect of the present disclosure, an operating method of a BS in a wireless communication system using beamforming includes transmitting a reference signal over a plurality of downlink Tx beams; receiving channel quality information of the transmitted reference signal; and generating effective channel quality information by compensating for the channel quality information according to beamforming gain compensation information.

According to a further aspect of the present disclosure, an operating method of an MS in a wireless communication system using beamforming includes receiving a reference signal using a plurality of downlink Tx beams; and measuring channel quality information of the received reference signal; and transmitting the channel quality information to a BS.

According to a further aspect of the present disclosure, an apparatus of a BS in a wireless communication system using beamforming includes a transmitter for transmitting a reference signal over a plurality of downlink Tx beams; a receiver for receiving channel quality information of the transmitted reference signal; and a controller for generating effective channel quality information by compensating for the channel quality information according to beamforming gain compensation information.

According to a further aspect of the present disclosure, an apparatus of an MS in a wireless communication system using beamforming includes a receiver for receiving a reference signal using a plurality of downlink Tx beams; and a controller for measuring channel quality information of the received reference signal; and a transmitter for transmitting the channel quality information to a BS.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION

Figure 1:
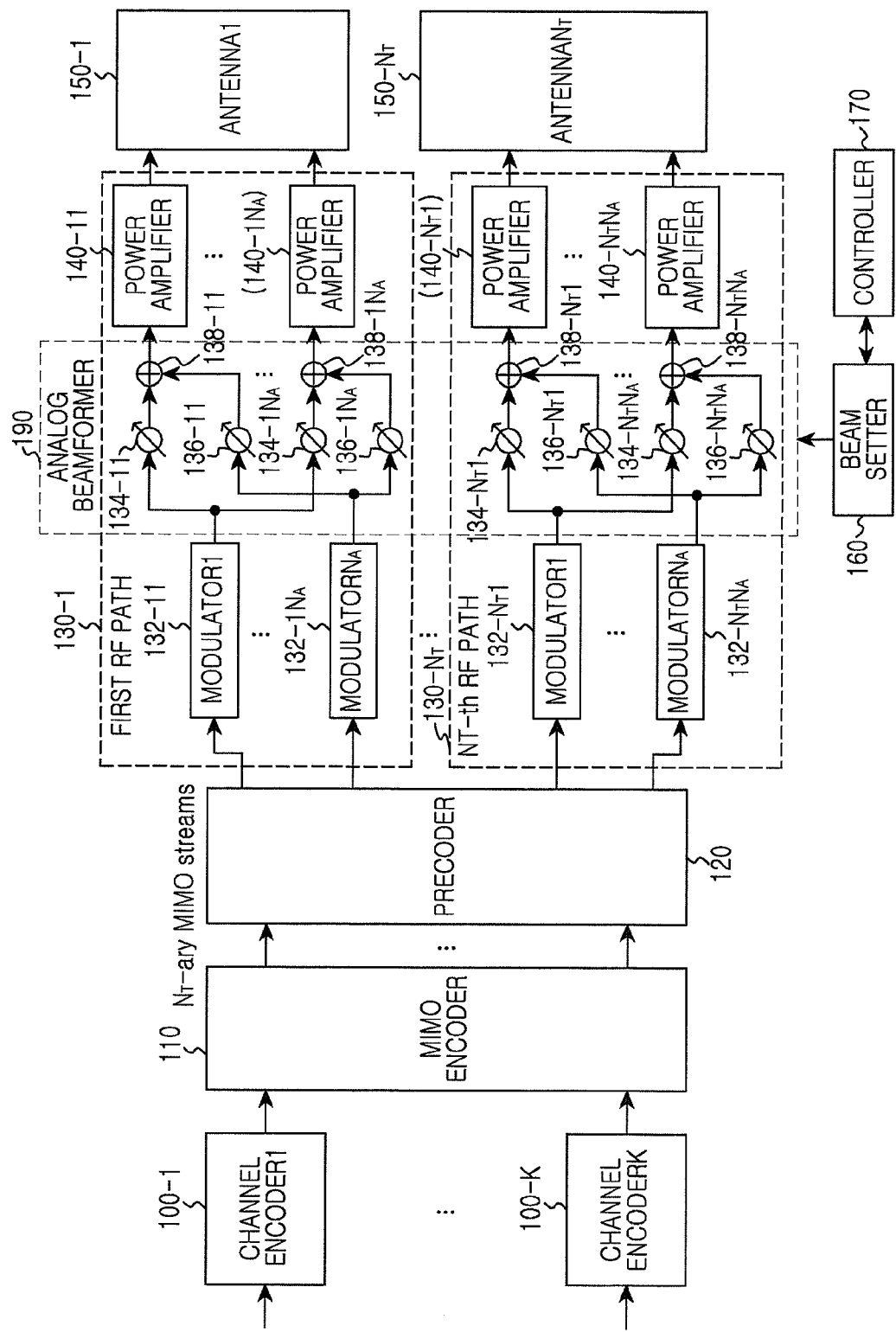
FIG. 1 illustrates a Base Station (BS) transmitting stage physical layer (PHY) for supporting beamforming according to an exemplary embodiment of the present disclosure.

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the disclosure as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure provide a method and an apparatus for operating beamforming gain difference compensation according to a transmitting (Tx)/receiving (Rx) beam pattern change in a beamforming based wireless communication system.

The present disclosure provides a method and an apparatus for efficiently operating beamforming by compensating for a beamforming gain difference between a reference signal control channel and a data channel according to multiple beams and beam pattern change in the beamforming based wireless communication system which operates one or more beam patterns (e.g., beamwidths, beamforming gains) with directivity for downlink.

The wireless communication system is advancing to support a higher data rate so as to satisfy a radio data traffic demand continuously growing. For example, to increase the data rate, the wireless communication system is under development to improve spectral efficiency based on communication techniques such as Orthogonal Frequency Division Multiple Access (OFDMA) and Multiple Input Multiple Output (MIMO).

However, as a demand for smart phones and table PCs increases and application programs requiring massive traffic sharply grow, the demand for the data traffic further is accelerated. In this regard, the spectral efficiency enhancement alone cannot satisfy the sharply increasing radio data traffic demand. To overcome this shortcoming, a wireless communication system using an ultrahigh frequency band is attracting more attention.

When the radio communication is supported in the ultrahigh frequency band, the frequency characteristics of the ultrahigh frequency band increase a propagation loss such as path loss or return loss. Thus, the wireless communication system using the ultrahigh frequency band is subject to the shrunk service coverage because the propagation loss shortens a propagation distance.

Hence, the wireless communication system using the ultrahigh frequency band can extend the propagation distance by mitigating the propagation path loss using beamforming, and thus increase the service coverage.

In the beamforming system, the Tx beamforming enhances directivity by focusing the propagation in a particular direction using a plurality of antennas. In so doing, the set of the antennas is referred to as an antenna array, and the antenna in the array is referred to as an array element.

The antenna array can include a linear array, a planar array, and so on. Since the Tx beamforming can lengthen the transmission distance by enhancing the signal directivity and transmit no signal in other directions than the corresponding direction, it can greatly cancel signal interference of other users than a corresponding user.

Meanwhile, a receiving stage can perform the beamforming on a receive signal using an Rx antenna array. The Rx beamforming can increase signal reception sensitivity in the corresponding direction by focusing the reception in a particular direction, and block an interference signal by excluding signals of other directions from the receive signal.

A high-frequency band wireless communication system needs to adopt the beamforming to mitigate the high propagation path loss in the high frequency band, and particularly, all the time to reduce imbalance between data and a control signal. For the beamforming, Sector Level Sweep (SLS) and Beam Refinement Protocol (BRP) adopted by Institute of Electrical and Electronics Engineers (IEEE) 802.11 ad are under consideration.

IEEE 802.11ad, which is based on Wireless Local Area Network (WLAN), provides a very small service coverage within a radius of 10~20 meters in the ultrahigh frequency band of 60 GHz. The beamforming is used to address the propagation problem in the ultrahigh frequency band.

According to the SLS defined in the IEEE 802.11ad specification, a Mobile Station (MS) for the beamforming repeatedly transmits the same sector frame in several directions, and an opponent MS receives the sector frames over a quasiomni antenna and feeds back in the direction of the best sensitivity.

Thus, the corresponding MS can obtain information of the best sensitivity direction of the opponent MS and thus fulfill the beamforming.

The BRP defined in the IEEE 802.11ad specification performs the SLS and then more finely adjusts the Tx and Rx beam directions between the MSs to enhance the Tx/Rx beamforming gain. In general, after the two MSs scan the optimal Tx beam through the SLS, and the BRP is used to scan the most suitable Rx beam for the Tx beam. The Tx/Rx beam direction combination is calibrated by repeating this process.

Beamforming gain difference compensation is explained first in a hybrid beamforming system of the present disclosure.

According to a selected MIMO/Beamforming (BF) mode (single beam or multi-beam, the number of Tx beams, beam pattern supported and beamforming gain, or MIMO Tx mode (e.g. MIMO-beamforming, MIMO-spatial multiplexing, and MIMO-space time coding)), a power boosting/deboosting level of a pilot subcarrier differs from an existing reference power level (e.g., measured frame preamble/midamble/Channel State Information Reference Signal (CSI-RS)) due to the array beamforming difference of different beamforming patterns. This affects an Adaptive Gain Control (AGC) design and requires Carrier to Interference and Noise Ratio (CINR)/Received Signal Strength Indicator (RSSI) measurement/feedback.

To predict an effective CINR, a baseline MIMO/BF mode (or the used beam pattern and beamforming gain) is defined in advance. In this case, a Base Station (BS) compensates for a beamforming gain variation according to the selected or scheduled hybrid MIMO/BF mode.

Next, the BS notifies the Tx MIMO/BF mode to the MS. The BS informs the MS of a particular beamforming pattern to deliver a reference signal.

To continue the effective CINR prediction, the BS notifies the MIMO/BF mode (or the used beamforming pattern and beamforming gain) to the MS. The MS can compensate for the beamforming gain variation caused by the different beams (or a pair of beams) different from the reference signal.

Alternatively, the MS informs the BS of the supportable Rx MIMO/BF mode or the supportable Rx beam pattern and beamforming gain. Next, when reporting Channel Quality Indicator (CQI) or the effective CINR, the MS notifies a particular MS Rx beam pattern used for a particular BS Tx pattern. The BS can compensate for the beamforming gain variation caused by the difference beams (or the pair of beams) with respect to the corresponding MS.

FIG. 1 illustrates a block diagram of a BS transmitting stage physical layer (PHY) for supporting the beamforming according to an exemplary embodiment of the present disclosure.

To represent a general beamforming support structure, FIG. 1 illustrates a hybrid structure applying both of analog beamforming and digital beamforming.

Referring to FIG. 1, the transmitting stage includes K-ary channel encoders 100-1 through 100-K, a MIMO encoder 110, a precoder 120, $N_T$-ary Radio Frequency (RF) paths 130-1 through 130-$N_T$, $N_T$-ary antennas 150-1 through 150-$N_T$, a beam setter 160, a controller 170, and an analog beamformer 190.

The K-ary channel encoders 100-1 through 100-K each include a channel encoder and a modulator for encoding, modulating, and outputting the signal to transmit to a receiving stage.

The MIMO encoder 110 multiplexes the modulated signals fed from the K-ary channel encoders 100-1 through 100-K, to signals to transmit through $N_T$-ary streams in order to send them over the $N_T$-ary antennas 150-1 through 150-$N_T$.

The precoder 120 precodes the $N_T$-ary signals fed from the MIMO encoder 110 to precodes for the digital beamforming and provides the precodes to the RF paths 130-1 through 130-$N_T$ respectively.

The $N_T$-ary RF paths 130-1 through 130-$N_T$ process the signals fed from the precoder 120 in order to output the signals through the corresponding antennas 150-1 through 150-$N_T$. In so doing, the $N_T$-ary RF paths 130-1 through 130-$N_T$ are constructed identically. Thus, the first RF path 130-1 is explained mainly here. The other RF paths 130-2 through 130-$N_T$ are constructed the same as the first RF path 130-1.

The first RF path 130-1 includes $N_A$-ary modulators 132-11 through 132-1$N_A$, the analog beamformer 190, and $N_A$-ary power amplifiers 140-11 through 140-1$N_A$. Herein, the $N_A$ denotes the number of antenna elements constructing the first antenna 150-1.

The $N_A$-ary modulators 132-11 through 132-1$N_A$ each modulate and output the signal fed from the precoder 120 according to a communication scheme. For example, the $N_A$-ary modulators 132-11 through 132-1$N_A$ each include an Inverse Fast Fourier Transform (IFFT) operator and a Digital to Analog Converter (DAC). The IFFT operator converts the signal output from the precoder 120 to a time-domain signal using IFFT. The DAC converts the time-domain signal output from the IFFT operator to an analog signal. The $N_A$-ary modulators 132-11 through 132-1$N_A$ each further include a Parallel to Serial (P/S) converter and a Cyclic Prefix (CP) adder.

The analog beamformer 190 changes and outputs the Tx beam direction of the $N_A$-ary transmit signals output from the $N_A$-ary modulators 132-11 through 132-1$N_A$ according to the control signal indicating the Tx beam direction provided from the beam setter 160.

For example, the analog beamformer 190 includes a plurality of phase shifters 134-11 through 134-1$N_A$ and 136-11 through 136-1$N_A$, and combiners 138-11 through 138-1$N_A$. The $N_A$-ary modulators 132-11 through 132-1$N_A$ each split the output signal to $N_A$-ary signals and output them to the respective phase shifters 134-11 through 134-1$N_A$ and 136-11 through 136-1$N_A$.

The phase shifters 134-11 through 134-1$N_A$ and 136-11 through 136-1$N_A$ change a phase of the signals output from the $N_A$-ary modulators 132-11 through 132-1$N_A$ according to the control signal indicating the Tx beam direction provided from the beam setter 160.

The combiners 138-11 through 138-1$N_A$ combine the output signals of the phase shifters 134-11 through 134-1$N_A$ and 136-11 through 136-1$N_A$ corresponding to the antenna elements.

The power amplifiers 140-11 through 140-1$N_A$ each amplify a power of the signal output from the combiners 138-11 through 138-1$N_A$ and output the amplified signal to the outside through the first antenna 150-1.

The beam setter 160 selects the Tx beam direction to be used to transmit the signal, and provides the control signal according to the selected Tx beam direction to the analog beamformer 190 under control of the controller 170.

For example, the beam setter 160 provides the control signal according to the Tx beam direction for carrying the reference signal, the preamble/midamble, or the data, to the analog beamformer 190 under the control of the controller 170.

For example, the beam setter 160 selects the Tx beam direction for attaining an optimal transmission efficiency with the receiving stage by considering channel information of the Tx beam directions provided from the MS under the control of the controller 170.

The controller 170 controls the beam setter 160 to select the Tx beam direction. For example, the controller 170 controls the beam setter 160 to send the reference signal or the data in the Tx beam directions supported by the transmitting stage. For example, the controller 170 controls the beam setter 160 to select the optimal Tx beam direction by taking into account the channel information of the Tx beam direction provided from the receiving stage.

The transmitting stage may receive the optimal Tx beam direction selected by the receiving stage, from the receiving stage. In this case, the beam setter 160 provides the analog beamformer 190 with the control signal and the data according to the optimal Tx beam direction selected by the receiving stage.

The controller 170 of the transmitting stage can send a control message to the opponent node (e.g., a serving BS, a neighboring BS, or the MS).

That is, the analog beamforming block after the DAC forms the beam in a particular direction by controlling the phase and the amplitude of the antenna elements through a plurality of phase shifters, a Power Amplifier (PA), and a Variable Gain Amplifier (VGA).

In so doing, the beamforming gain is increased by grouping the antenna elements to the antenna array. By contrast, the RF path including the IFFTs, the MIMO encoder, and the precoder before the DAC can obtain the additional beamforming gain and also achieve multi-user operation, frequency selective allocation, and multi-beamforming. The actual beamforming structure can vary by changing and combining the function blocks.

Herein, the one or more beams of the different beamwidths and beamforming gains are differently operated according to the reference signal/data channel/control channel, the MS mobility and the channel characteristics, or the uplink/downlink or the transmit/receive through the analog beamforming based on the hybrid beamforming structure.

Thus, the selected beam is generated by adjusting the beamforming weight coefficient of the analog/digital stage to attain a particular beamwidth and a particular beamforming gain in a particular direction. In so doing, with the same antenna input power, the wide beamwidth generally decreases the maximum beamforming gain with respect to the beam directivity.

The block diagram and the beamforming structure/operation of FIG. 1 are substantially applicable to the beamforming receiving stage, except for some components (e.g., FFT, LNA, and ADC).

Figure 2:
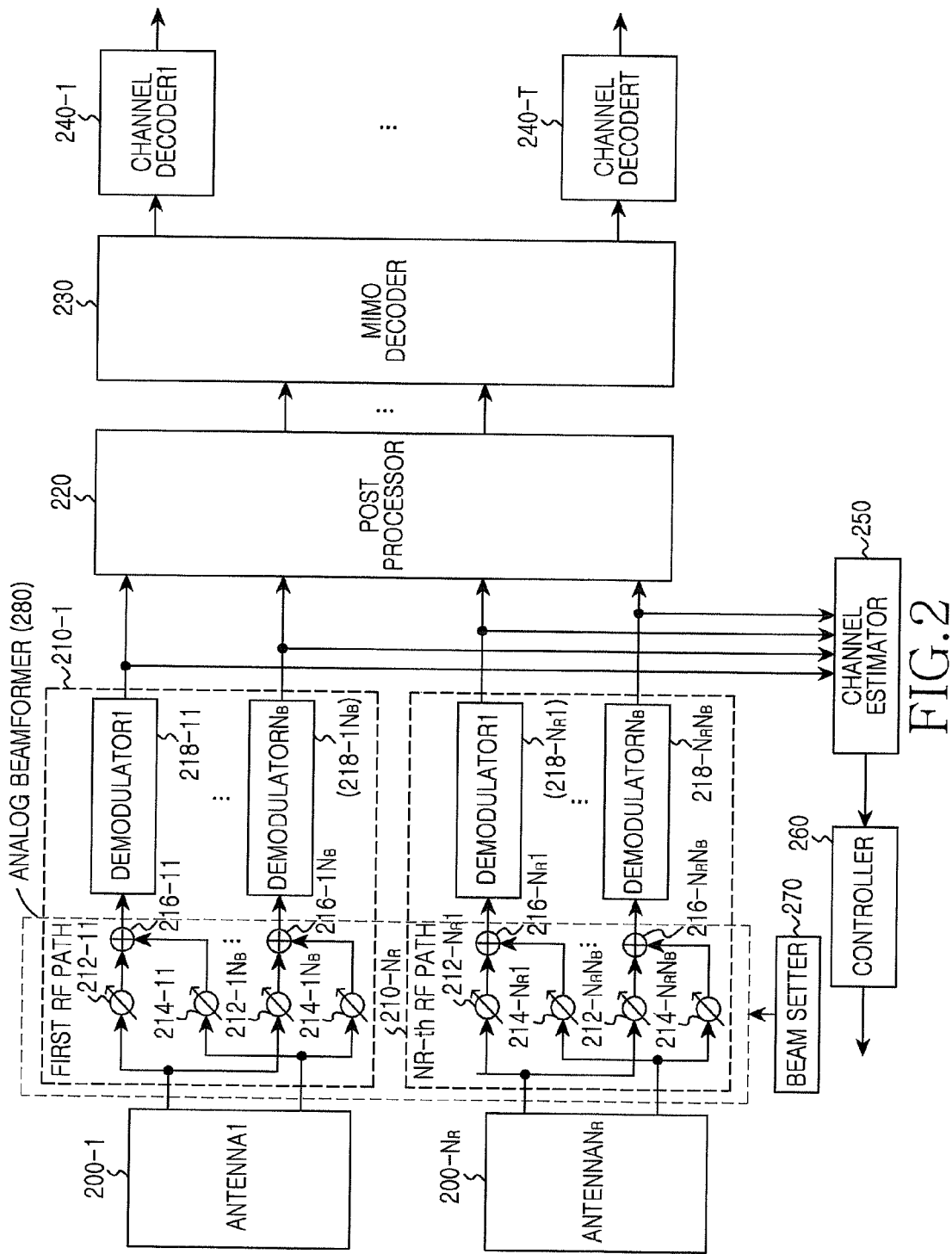
FIG. 2 illustrates a Mobile Station (MS) receiving stage PHY for supporting the beamforming according to an exemplary embodiment of the present disclosure.

FIG. 2 illustrates a block diagram of an MS receiving stage PHY for supporting the beamforming according to an exemplary embodiment of the present disclosure.

Referring to FIG. 2, the receiving stage includes $N_R$-ary antennas 200-1 through 200-$N_R$, $N_R$-ary RF paths 210-1 through 210-$N_R$, a postprocessor 220, a MIMO decoder 230, T-ary channel decoders 240-1 through 240-T, a channel estimator 250, a controller 260, and a beam setter 270.

The $N_R$-ary RF paths 210-1 through 210-$N_R$ process the signals received via the corresponding antennas 200-1 through 200-$N_R$. The $N_R$-ary RF paths 210-1 through 210-$N_R$ are constructed identically. Accordingly, the structure of the first RF path 210-1 is mainly described. The other RF paths 210-2 through 210-$N_R$ are constructed the same as the first RF path 210-1.

The first RF path 210-1 includes an analog beamformer 280 and $N_B$-ary demodulators 218-11 through 218-1$N_B$.

Herein, the $N_B$ denotes the number of antenna elements constructing the first antenna 200-1.

The analog beamformer 280 alters and outputs the direction of the $N_B$-ary receive signals output from the antenna elements of the first antenna 200-1 according to the Tx beam direction provided from the beam setter 270. For example, the analog beamformer 280 includes a plurality of phase shifters 212-11 through 212-1$N_B$ and 214-11 through 214-1$N_B$, and combiners 216-11 through 216-1$N_B$.

The antenna elements of the first antenna 200-1 split the receive signal to $N_B$-ary signals and output them to the respective phase shifters 212-11 through 212-1$N_B$ and 214-11 through 214-1$N_B$. The phase shifters 212-11 through 212-1$N_B$ and 214-11 through 214-1$N_B$ change the phase of the signals output from the antenna elements of the first antenna 200-1 according to the Rx beam direction provided from the beam setter 270. The combiners 216-11 through 216-1$N_B$ combine the output signals of the phase shifters 212-11 through 212-1$N_B$ and 214-11 through 214-1$N_B$ corresponding to the antenna elements.

The $N_B$-ary demodulators 218-11 through 218-1$N_B$ demodulate and output the received signals fed from the combiners 216-11 through 216-1$N_B$ according to the communication scheme. For example, the $N_B$-ary demodulators 218-11 through 218-1$N_B$ each include an Analog to Digital Converter (ADC) and an FFT operator. The ADC converts the receive signal fed from the combiners 216-11 through 216-1$N_B$ to a digital signal. The FFT operator converts the signal fed from the ADC to a frequency-domain signal using FFT.

The postprocessor 220 post-decodes the signals fed from the $N_R$-ary RF paths 210-1 through 210-$N_R$ according to the precoding scheme of the transmitting stage, and provides the post-decoded signals to the MIMO decoder 230.

The MIMO decoder 230 multiplexes the $N_R$-ary receive signals output from the postprocessor 220 to T-ary signals so that the T-ary channel decoders 240-1 through 240-T can decode the signals.

The T-ary channel decoders 240-1 through 240-T each include a demodulator and a channel decoder, for demodulating and decoding the signal received from the transmitting stage.

The channel estimator 250 estimates the channel information based on the reference signal transmitted from the transmitting stage in the Tx beam directions. When a scan event occurs, the channel estimator 250 estimates the channel information of each Tx beam direction. Herein, the channel information includes at least one of the SNR, the CINR, and the RSSI.

The controller 260 transmits the channel information of the Tx beam directions estimated by the channel estimator 250, to the transmitting stage. For example, the controller 260 transmits the channel information of the Tx beam directions of good channel status, to the transmitting stage.

For example, when the receiving stage supports the Rx beamforming, the controller 260 can transmits the channel information of the Tx beam directions having the channel status exceeding a reference value per Rx beam direction, to the transmitting stage.

The controller 260 may select the Tx beam direction for attaining the optimal transmission efficiency with the transmitting stage, by considering the channel information of the Tx beam directions estimated by the channel estimator 250.

For example, the controller 260 selects the Tx beam direction for attaining the optimal transmission efficiency with the transmitting stage, by considering the channel information of the Tx beam directions estimated by the channel estimator 250.

Figure 3:
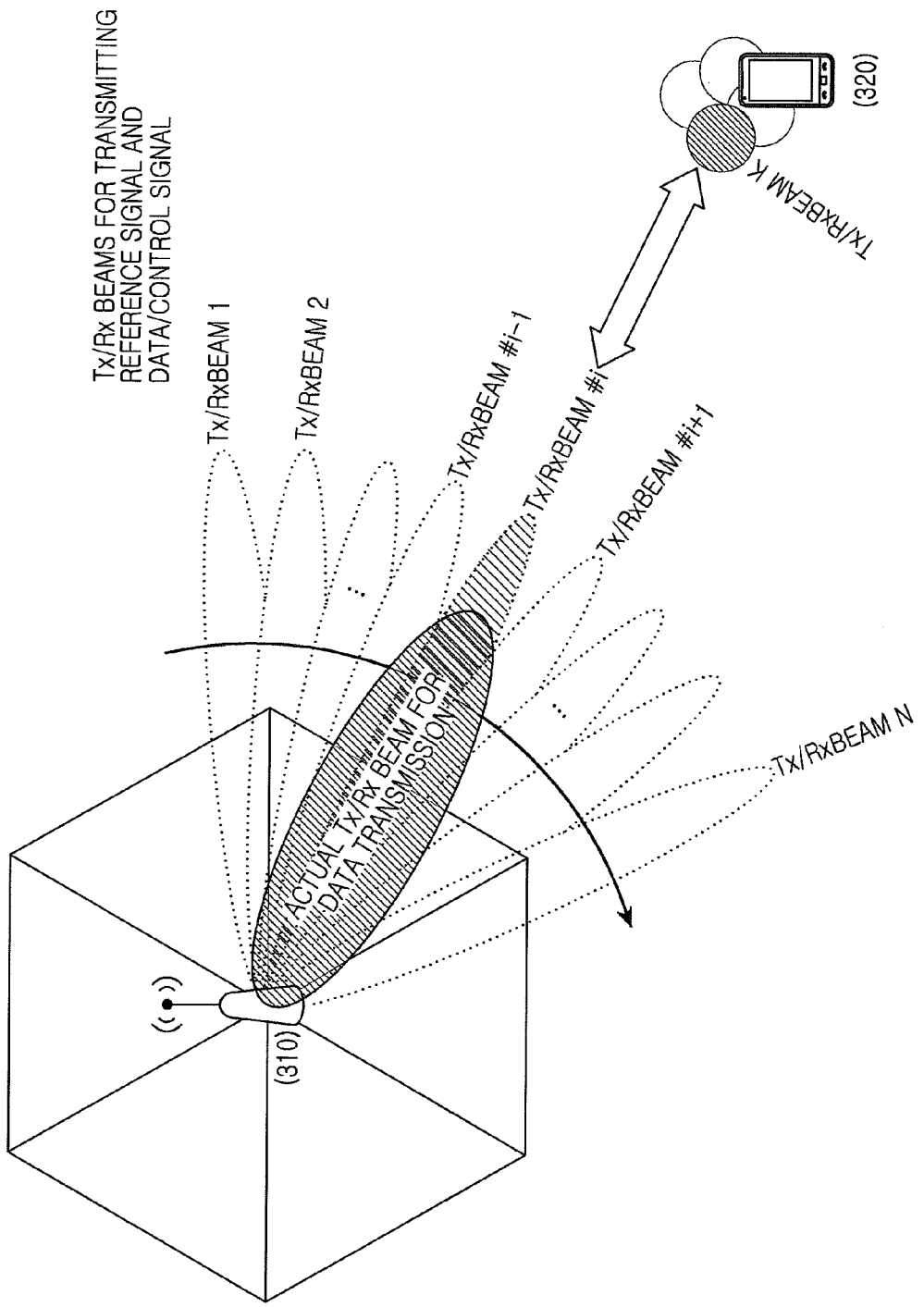
FIG. 3 illustrates communication between a BS operating a plurality of Tx beams and an MS supporting a plurality of Rx beams in one BS sector according to an exemplary embodiment of the present disclosure.

FIG. 3 illustrates communication between a BS operating a plurality of Tx beams and an MS supporting a plurality of Rx beams in the single BS sector according to an exemplary embodiment of the present disclosure.

Referring to FIG. 3, the BS 310 sweeps and transmits a plurality of beamforming signals concurrently or sequentially.

According to various implementations, the MS 320 can receive the beam in all directions without supporting the Rx beamforming, support the Rx beamforming in a particular beamforming pattern at a time because of the receiving stage structure constraint, or support the Rx beamforming and receive the multiple beamforming patterns in different directions.

The MS not supporting the Rx beamforming measures and reports the channel quality of the reference signal per Tx beam of the BS, and selects the optimal beam from the Tx beams of the BS.

The MS supporting the Rx beamforming measures the channel quality of the Tx beams of the BS per Rx beam pattern of the MS, and reports all or part of top results per combination of the BS Tx beam and the MS Rx beam, to the BS so that the BS allocates the MS the adequate Tx beam.

In so doing, when the MS can receive the multiple Tx beams of the BS at the same time or support multiple combinations of the BS Tx beam and the MS Rx beam, the BS can select the beam by considering the repeated transmission or the simultaneous diversity transmission.

The one or more beams of the different beamwidths and beamforming gains are differently operated in the hybrid beamforming structure of FIG. 1 according to the reference signal/data channel/control channel, the MS mobility and the channel characteristics, or the uplink/downlink or the transmit/receive through the analog beamforming.

In FIG. 3, the BS sweeps and sends the reference signal for operating link adaptation including the MCS level determination for the data transmission/reception of the corresponding MS, through the beam of the narrow beamwidth, and transmits or receives the actual data of the corresponding MS through the beam of the wide beamwidth.

Figure 4:
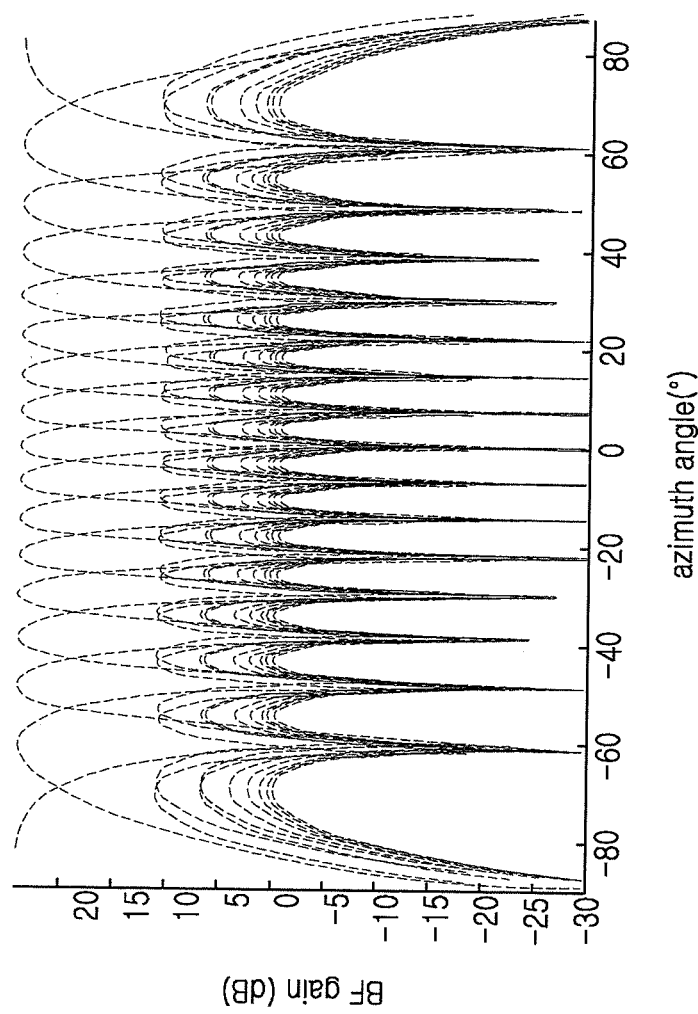
FIG. 4 illustrates a plurality of basic unit beams by dividing a 180-degree sector to 16 sectors of a uniform wavenumber based on a beamforming weight coefficient such as Discrete Fourier Transform (DFT) matrix with respect to 16×1 Uniform Linear Array (ULA) according to an exemplary embodiment of the present disclosure.

FIG. 4 illustrates a plurality of basic unit beams by dividing a 180-degree sector to 16 sectors of a uniform wavenumber based on the beamforming weight coefficient such as Discrete Fourier Transform (DFT) matrix with respect to 16×1 Uniform Linear Array (ULA) according to an exemplary embodiment of the present disclosure.

Referring to FIG. 4, each basic unit beam attains the same maximum beamforming gain in a particular direction, and evenly supports the 180-degree sector within the same beamforming gain range of the beams.

Figure 5:
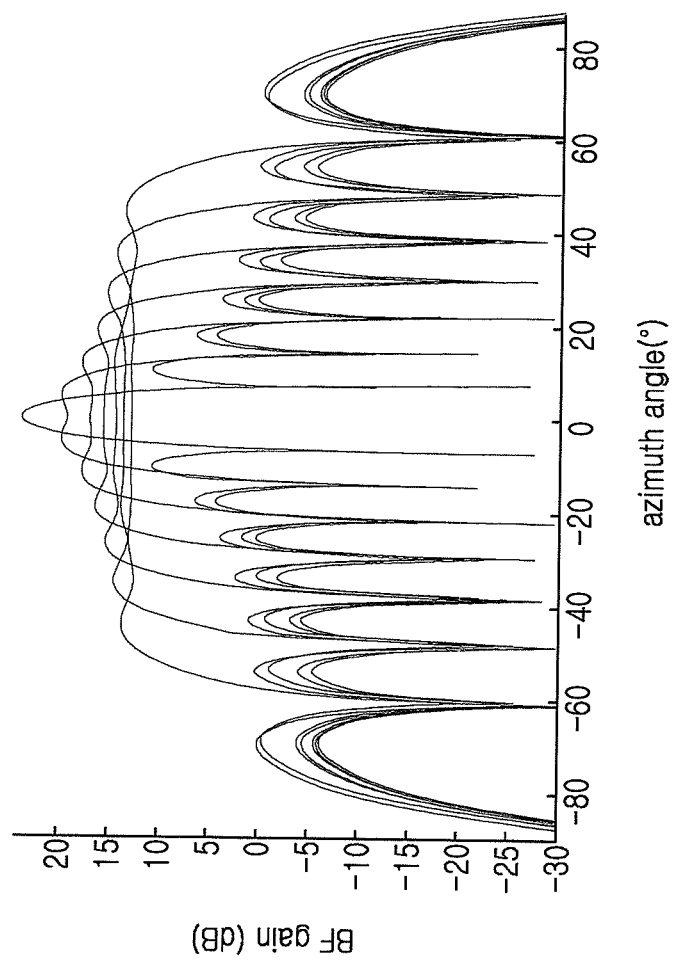
FIG. 5 illustrates a beam pattern when two adjacent unit beams of the basic unit beam in a 0-degree direction are superposed and added based on the beamforming weight coefficient such as DFT matrix with respect to the 16×1 ULA according to an exemplary embodiment of the present disclosure.

FIG. 5 illustrates a beam pattern when two adjacent unit beams of the basic unit beam in a 0-degree direction are superposed and added based on the beamforming weight coefficient such as DFT matrix with respect to the 16×1 ULA according to an exemplary embodiment of the present disclosure.

Referring to FIG. 5, when the selected beam is superposed, the beam weight coefficient is normalized according to the number of the superposed beams for the sake of the same power for the antennas in the analog stage. The normalization reduces the directivity but increases the beamwidth in a particular direction by virtue of the superposed unit beams. By contrast, the maximum beamforming gain decreases in the particular direction. Hence, such a trade-off is considered to determine the number of the superposed unit beams in the actual operation, and the link adaptation such as MCS determination can be performed additionally by considering the reduced beamforming gain of the superposed beams.

Alternatively, to operate the different beam patterns for the signal Tx directions, a precode or a beamforming weight or coefficient can be set to attain the particular beamwidth and beamforming gain for the antenna array, or a sub-array can be constructed to differently operate the antenna elements or the beam weight coefficient. In this case, the trade-off between the beamwidth and the beamforming gain can also involve.

Figure 6:
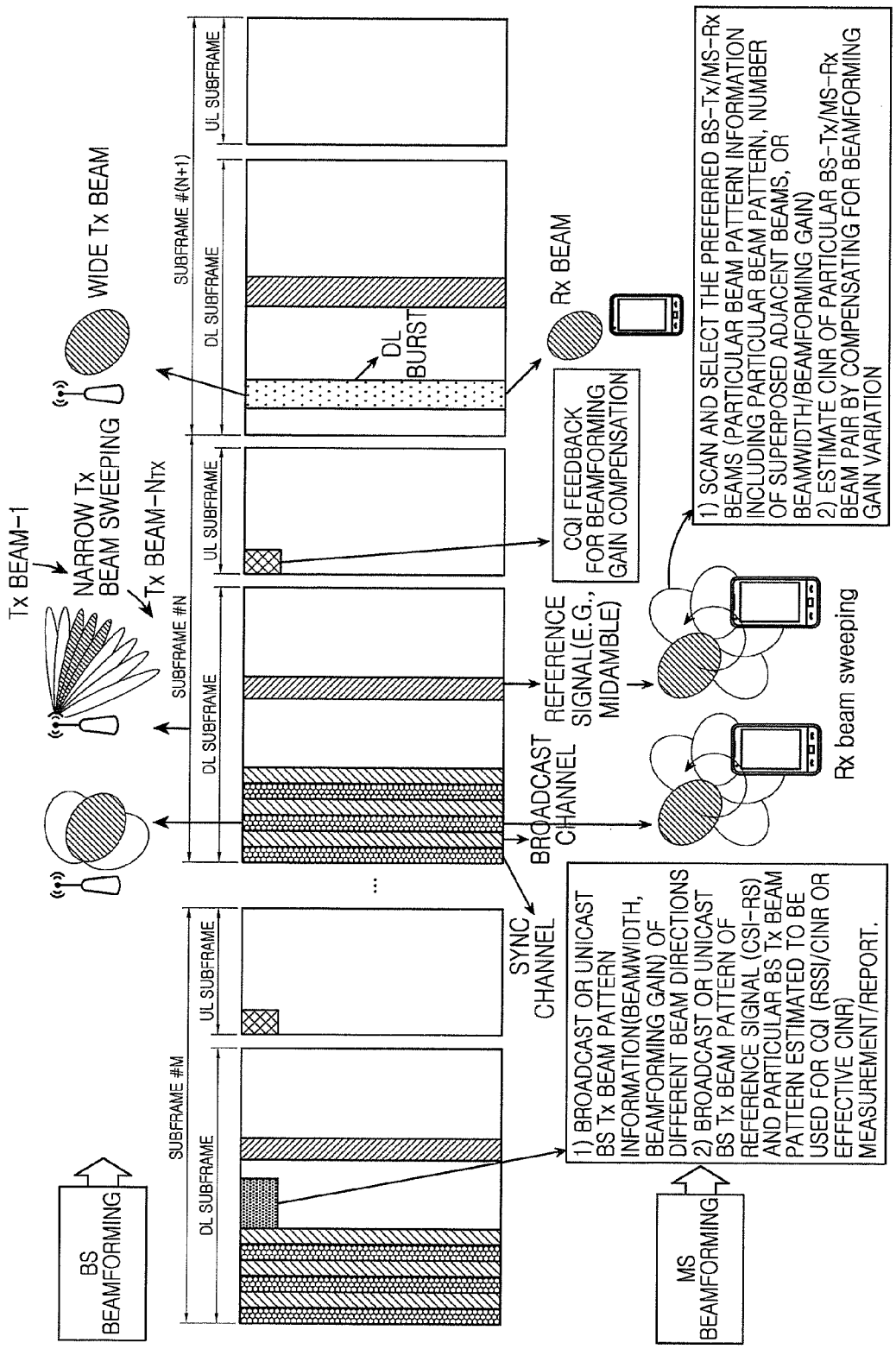
FIG. 6 illustrates a signal frame transmitted per sector and different Tx/Rx beam pattern operations of the BS and the MS for uplink/downlink in the corresponding frame structure according to an exemplary embodiment of the present disclosure.

FIG. 6 illustrates a signal frame transmitted per sector and different Tx/Rx beam pattern operations of the BS and the MS for the uplink/downlink in the corresponding frame structure according to an exemplary embodiment of the present disclosure.

In FIG. 6, the reference signal such as midamble or CSI-RS for the downlink carries a pilot signal which is mapped to the basic unit beam of the relatively narrow beamwidth in different directions.

Referring to FIG. 6, the BS broadcasts or unicasts BS Tx beam pattern information of the different beam direction to the MS. The BS Tx beam pattern information includes the beamwidth, the beamforming gain, and so on. The BS broadcasts or unicasts the BS Tx beam pattern of the reference signal (CSI-RS) and particular BS Tx beam pattern information estimated to be used for the CQI (the RSSI/CINR or the effective CINR) measurement/report.

Referring to FIG. 6, the MS measures the channel quality and estimates the particular single beam or the one or more beams superposed or generated in the corresponding wide beamwidth, based on the pilot signal mapped to the unit beams of the narrow beamwidth received from the BS in the different directions.

Based on the measurement, the MS can measure, update, and predict an instantaneous or temporal average/variation/standard deviation of the channel quality metric such as CINR or RSSI of the downlink.

Based on the information acquired through the measurement/estimation, the MS selects the adequate MCS level supported for the MS's data transmission/reception and reports the selects MCS level as the effective CINR (or the MCS level) to the BS.

The MS can predict the channel quality by compensating for the difference between the beamforming gain information of the reference signal used to measure the channel quality (e.g., CINR, RSSI) and the beamforming gain used or supposed for the data transmission of the BS using the beamforming gain difference information received from the BS, and select the optimal MCS level.

Figure 7:
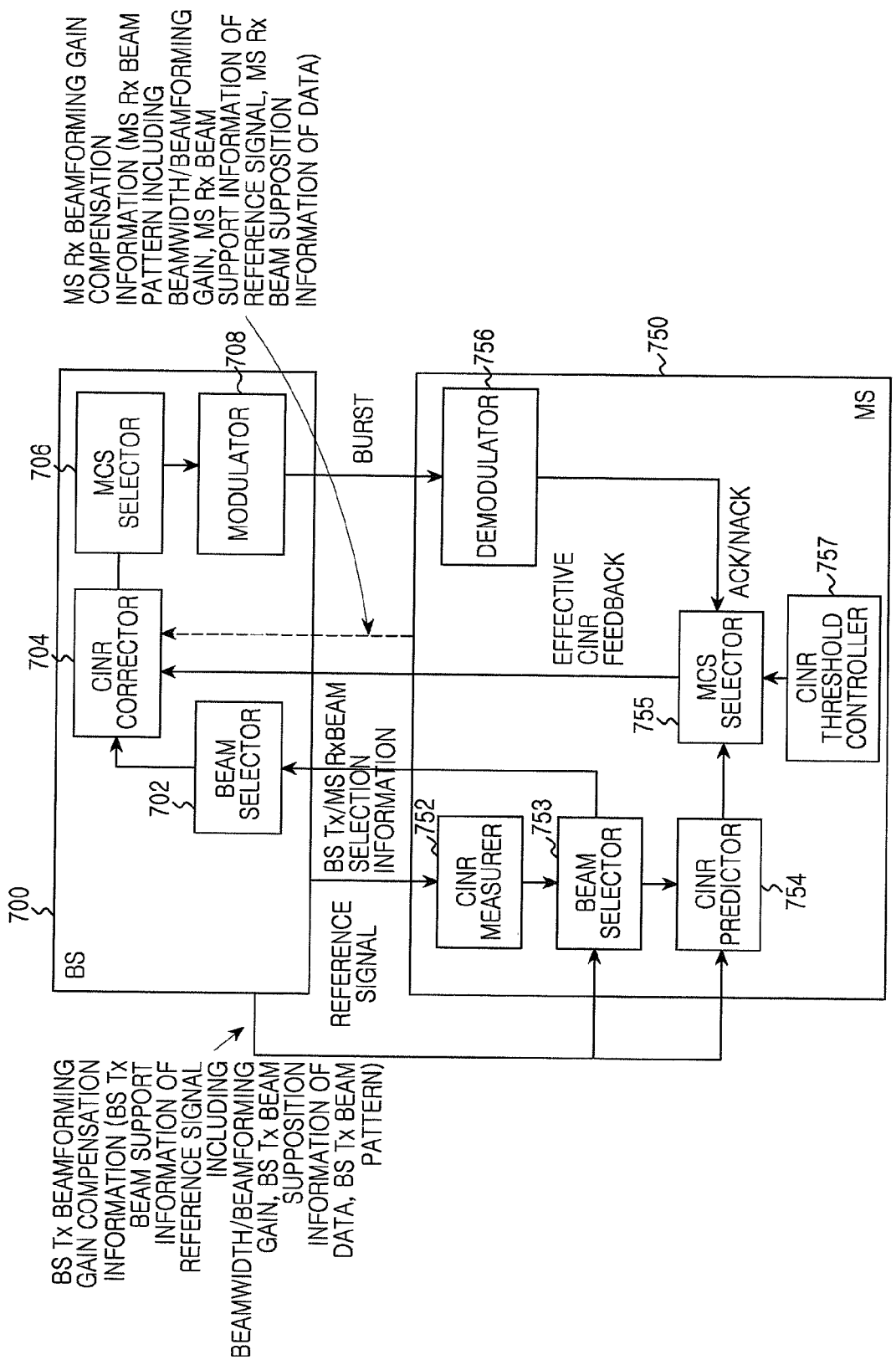
FIG. 7 illustrates Modulation and Coding Scheme (MCS) level determined by considering channel quality measurement and beamforming gain difference compensation of the MS according to an exemplary embodiment of the present disclosure.

FIG. 7 illustrates the MCS level determined by considering the channel quality measurement and the beamforming gain difference compensation of the MS according to an exemplary embodiment of the present disclosure.

In FIG. 7, the BS 700 broadcasts or unicasts to the MS (e.g., an MS 750) in the cell/sector, the beamforming gain difference applied to the actual data against the reference signal applied to estimate and report the effective CINR.

A CINR measurer 752 of the MS 750 measures the CINR by estimating the channel of the reference signal received from the BS. The CINR measurer 752 measures the channel quality and estimates the particular single beam or the one or more beams superposed or generated in the corresponding wide beamwidth, based on the pilot signal mapped to the unit beams of the narrow beamwidth received from the BS in the different directions.

A beam selector 753 selects the BS Tx beam and the MS Rx beam based on the measurement of the CINR measurer 752.

A CINR predictor 754 predicts the channel quality by compensating for the difference between the beamforming gain information of the reference signal used to measure the channel quality (e.g., CINR, RSSI) and the beamforming gain used or assumed for the data transmission of the BS using the beamforming gain difference information received from the BS.

An MCS selector 755 selects the optimal MCS level based on the prediction value and Acknowledge (ACK)/Negative ACK (NACK) information indicating whether the received data burst is successfully decoded, and sends the selected MCS as the effective CINR to a CINR corrector 704 of the BS 700. A CINR threshold controller 757 adjusts a CINR threshold for selecting the MCS level based on the ACK/NACK statistics. The MCS level is selected within a threshold range of the CINR threshold controller 757. A demodulator 756 demodulates and decodes the burst received from the BS 700, and provides the corresponding ACK/NACK information to the MCS selector 755.

The beam selection information of the beam selector 753 is provided to a beam selector 702 of the BS 700 so that the BS 700 can select the beam. In this case, the beamforming gain difference applied to the actual data against the reference signal used to estimate and to report the effective CINR can be provided to the CINR corrector 704 of the BS 700.

In so doing, the CINR corrector 704 provides the modified channel quality of the compensated beamforming gain difference to an MCS selector 706, and a modulator 708 modulates, encodes, and transmits the burst according to the MCS level selected by the MCS selector 706.

Alternatively, the BS may broadcast or unicast to the MS the beamforming gain difference against a particular reference beam according to the beam pattern applied per MS, and the MS may periodically or aperiodically notify the beam pattern for the beamforming gain compensation.

Meanwhile, the MS may report the measured channel quality to the BS, and the BS may perform scheduling based on the link adaptation by compensating the beamforming gain according to the beam pattern difference by itself.

Table 1 and Table 2 show information tables including a message from the BS to the MS for carrying the beamforming gain difference against a particular reference beam based on the beam pattern.

TABLE 1

| Array Gain Difference against Beam_Type_1 | dB |
|---|---|
| Beam_Type_2 | −4.7712 |
| Beam_Type_3 | −6.9897 |
| Beam_Type_4 | −8.4510 |
| Beam_Type_5 | −9.5424 |
| Beam_Type_6 | −10.4139 |

TABLE 2

| Array Gain Difference against Beam_Type_(x-1) | dB |
|---|---|
| Delta_Beam_Type_2 | −4.7712 |
| Delta_Beam_Type_3 | −2.2185 |
| Delta_Beam_Type_4 | −1.4613 |
| Delta_Beam_Type_5 | −1.0914 |
| Delta_Beam_Type_6 | −0.8715 |

In so doing, the CINR from the signal of the receiving stage can be calculated as follows.

$$r_k = \sqrt{B_p}\, \rho_d v_d^* H_d \omega_d x_k + \sqrt{B_p} \sum_{\substack{j \in N_{beam} \\ (\omega_j \neq \omega_d)}} \rho_j v_d^* H_d \omega_j x_{j,k} + \sqrt{B_p} \sum_{\substack{i \in N_{BS} \\ (i \neq sBS)}} \sum_{j \in N_{beam}} \rho_j^{(i)} v_d^* H_l^{(i)} \omega_j^{(i)} x_{j,k}^{(i)} + n_k \quad (1)$$

$N_{BS}$ and $N_{beam}$ denote the number of BSs and the number of beams per BS respectively.

$\rho_d$ and $\rho_j$ denote a desired signal and an interference signal channel coefficient in a data tone k.

H, υ, and ω, denote a channel matrix, a receiver BF weight, and a transmitter BF weight.

$x_k$ denotes a midamble symbol transmitted.

$B_p$ denotes a power boosting factor per tone.

$n_k'$ denotes a thermal noise in the tone k.

At this time, signal strengths of the receive signal and the interference signal measured from the reference signal are defined based on the following equation.

$$P_{S,Ref}^{(n)} = \frac{B_{A,Ref}^{(n)} B_p}{N_p} \sum_{k=0}^{N_p-1} |c_k|^2 \quad (2)$$

$$\approx \frac{G_{MSRx,Ref}^{(n)} G_{BSTx,Ref}^{(n)} B_p}{N_p} \sum_{k=0}^{N_p-1} |c_k|^2$$

$$I_{S,Ref}^{(n)} = \frac{B_{A,Ref}^{(n)} B_p}{N_p} \sum_{k=0}^{N_p-1} |c_k|^2$$

For example, to estimate the CINR, the receive signal and the interference signal of the data channel can be expressed as the following equation.

$$P_{S,data}^{(n)} = \frac{B_{A,data}^{(n)}}{N_d} \sum_{k=0}^{N_d-1} |c_k|^2 \quad (3)$$

$$\approx \frac{G_{MSRx,data}^{(n)} G_{BSTx,data}^{(n)} B_p}{N_d} \sum_{k=0}^{N_d-1} |c_k|^2$$

$$\approx \frac{B_{A,data}^{(n)}}{B_{A,Ref}^{(n)} B_p} P_{S,Ref}^{(n)}$$

$$= \frac{G_{MSRx,data}^{(n)}}{G_{MSRx,Ref}^{(n)}} \frac{G_{BSTx,data}^{(n)}}{G_{BSTx,Ref}^{(n)}} \frac{1}{B_p} P_{S,Ref}^{(n)}$$

$$I_{S,Ref}^{(n)} \approx \frac{B_{A,data}^{(n)} B_p}{N_d} \sum_{k=0}^{N_d-1} |c_k|^2$$

$$\approx \frac{B_{A,data}^{(n)}}{B_{A,Ref}^{(n)} B_p} I_{S,Ref}^{(n)}$$

$$= \frac{G_{MSRx,data}^{(n)}}{G_{MSRx,Ref}^{(n)}} \frac{G_{BSTx,data}^{(n)}}{G_{BSTx,Ref}^{(n)}} \frac{1}{B_p} I_{S,Ref}^{(n)}$$

The CINR estimated from the value can be given by the following equation.

$$CINR = \sum_{n=0}^{N_b-1} \frac{P_S^{(n)}}{P_I^{(n)} + P_N^{(n)}} \quad (4)$$

$$\approx \sum_{n=0}^{N_b-1} \frac{B_{A,data}^{(n)} P_{S,Ref}^{(n)}}{B_{A,data}^{(n)} P_{S,Ref}^{(n)} + B_{A,Ref}^{(n)} B_p N_0^{(n)}}$$

$$\approx \sum_{n=0}^{N_b-1} \frac{G_{MSRx,data}^{(n)} G_{BSTx,data}^{(n)} P_{S,Ref}^{(n)}}{G_{MSRx,data}^{(n)} G_{BSTx,data}^{(n)} P_{S,Ref}^{(n)} + G_{MSRx,Ref}^{(n)} G_{BSTx,Ref}^{(n)} B_p N_0^{(n)}}$$

$P_S^{(n)}$, $P_I^{(n)}$, and $P_N^{(n)}$ denote a signal power, an interference power, and a noise power respectively. $G_{MSRx,Ref}^{(n)}$, $G_{MSRx,data}^{(n)}$, $G_{BSTx,Ref}^{(n)}$, and $G_{BSTx,data}^{(n)}$ denote the MS Rx beamforming gain of the reference signal, the MS Rx beamforming gain of the data, the BS Tx beamforming gain of the reference signal, and the BS Tx beamforming gain of the data with respect to an N-th beam pair $N_b$ having the different BS Tx beam and MS Rx beam directions.

At this time, the beamforming gain difference according to the beam pattern (beamwidth, BF gain) difference of the BS for the same Tx direction can be given by the following equation in the similar fashion.

$$\Delta P_S^{(n)}(\text{dB}) \triangleq 10 \log_{10}\left(\frac{\|v_d^{(n)} * H_d^{(n)} \omega_d'^{(n)}\|^2}{\|v_d^{(n)} * H_d^{(n)} \omega_d^{(n)}\|^2}\right) \quad (5)$$

$$\approx \Delta G_{array}^{BS_{TX}}$$

$$= G_{\omega_d'}^{BS_{TX}} - G_{\omega_d}^{BS_{TX}}$$

As such, the BS can send the beamforming gain difference according to the calculated beam pattern to the MS so as to compensate for the beamforming gain difference or to operate the corresponding value in consideration of resource scheduling.

As stated above, the BS informs the MS of the information about the one or more beam patterns (beam width, beamforming gain, etc.) which can be operated differently in the beam Tx directions, and the MS compensates for the beamforming gain difference based on the change of the beam pattern in the same Tx/Rx direction when the particular BS Tx beam and MS Rx beam are selected.

Alternatively, the MS may inform the BS of the information about the one or more beam patterns (beam width, beamforming gain, etc.) which can be operated differently in the beam Rx directions, and the BS may compensate for the beamforming gain difference based on the change of the beam pattern in the same Tx/Rx direction when the particular BS Tx beam and MS Rx beam are selected.

Figure 8:
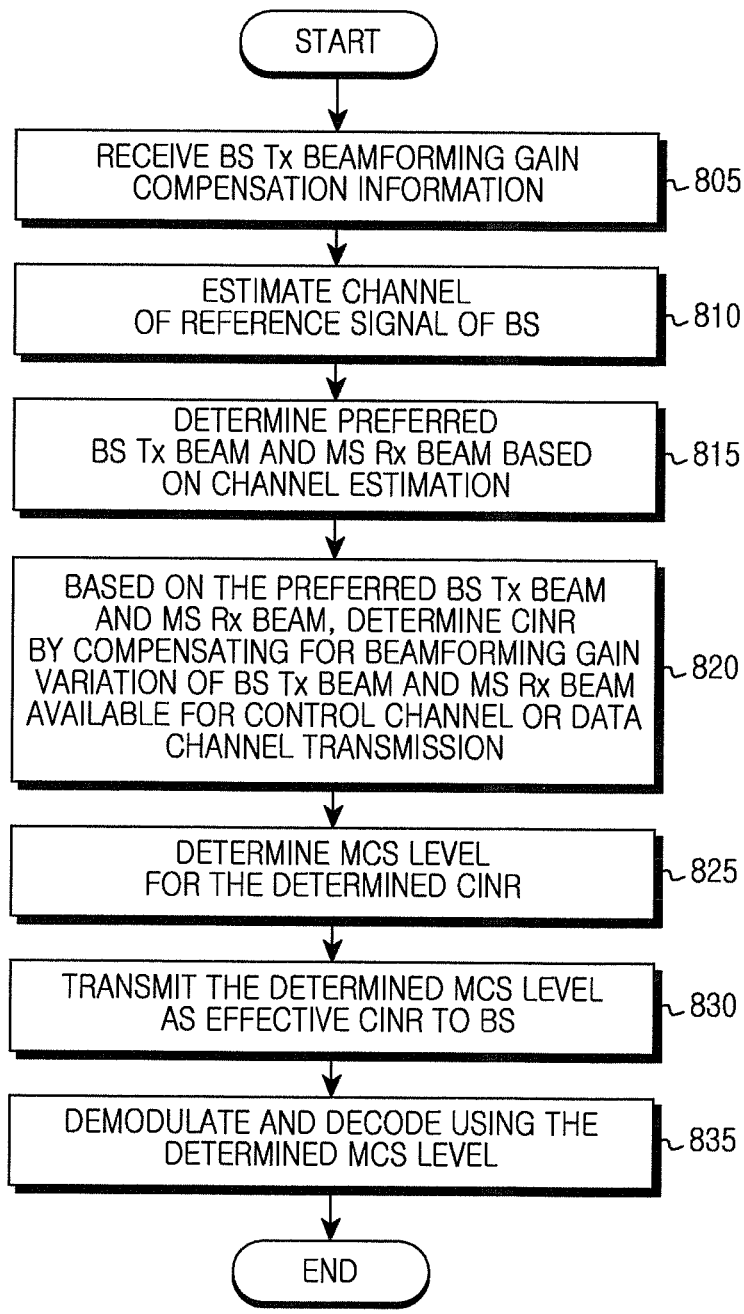
FIG. 8 illustrates operations of the MS for determining the MCS level of the downlink according to an exemplary embodiment of the present disclosure.

FIG. 8 illustrates a flowchart of operations of the MS for determining the MCS level of the downlink according to an exemplary embodiment of the present disclosure.

Referring to FIG. 8, the MS receives the BS Tx beamforming gain compensation information which is broadcast or unicast by the BS in step 805. The BS Tx beamforming gain compensation information can include BS Tx support information of the reference signal including the beamwidth/beamforming gain, BS Tx beam supposition information of the data, and a BS Tx beam pattern.

Next, the MS estimates the channel of the reference signal of the BS in step 810, and determines preferred BS Tx beam and MS Rx beam based on the channel estimation value in step 815. In so doing, it is assumed that the MS supports the Rx beamforming. When the BS sweeps the Tx beam and the MS sweeps the Rx beam, the MS determines the channel quality of the BS Tx beam and the MS Rx beam and determines the BS Tx beam and the MS Rx beam of the best channel quality as the preferred BS Tx beam and MS Rx beam.

In step 820, based on the preferred BS Tx beam and MS Rx beam, the MS determines the CINR by compensating for the beamforming gain variation of the BS Tx beam and the MS Rx beam which can be used to send the control channel or the data channel. In so doing, the MS is assumed to obtain MS Rx beamforming gain compensation information. The MS Rx beamforming gain compensation information can include an MS Rx beam pattern including the beamwidth/beamforming gain, MS Rx beam support information of the reference signal, and MS Rx beam supposition information of the data.

In step 825, the MS determines the MCS level for the determined CINR.

In step 830, the MS transmits the determined MCS level as the effective CINR to the BS.

In step 835, the MS demodulates and decodes the downlink burst using the MCS level which is determined finally by the BS and used to carry the data burst. Next, the MS finishes this process.

Figure 9:
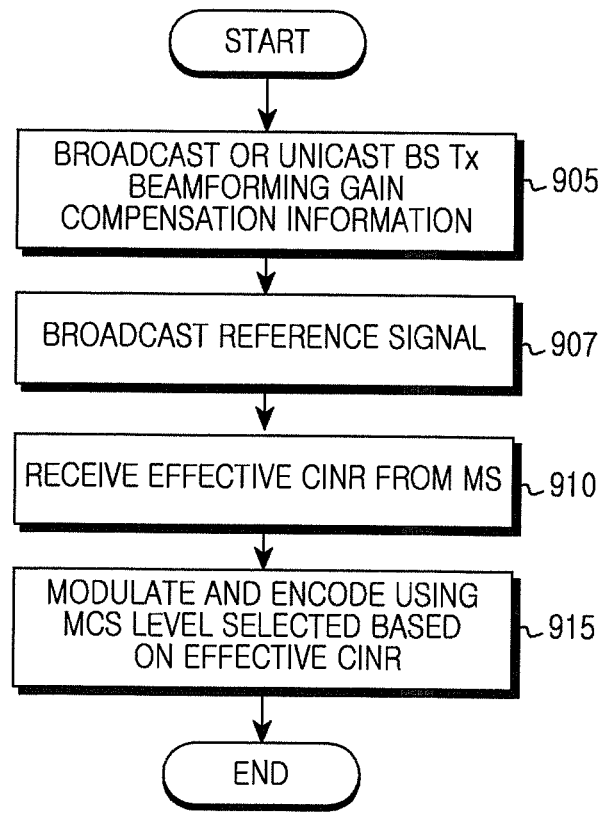
FIG. 9 illustrates operations of the BS when the MS determines the MCS level of the downlink according to an exemplary embodiment of the present disclosure.

FIG. 9 illustrates a flowchart of operations of the BS when the MS determines the MCS level of the downlink according to an exemplary embodiment of the present disclosure.

Referring to FIG. 9, the BS broadcasts or unicasts the BS Tx beamforming gain information in step 905. The BS Tx beamforming gain compensation information can include the BS Tx support information of the reference signal including the beamwidth/beamforming gain, the BS Tx beam supposition information of the data, and the BS Tx beam pattern.

In step 907, the BS broadcasts the reference signal. With the reference signal, the MS can estimate the channel and determine the BS Tx beam and the MS Rx beam of the best channel quality as the preferred BS Tx beam and MS Rx beam.

In step 910, the BS receives the effective CINR from the MS.

In step 915, the BS modulates and encodes the downlink burst using the MCS level selected based on the effective CINR.

Next, the BS finishes this process.

Figure 10:
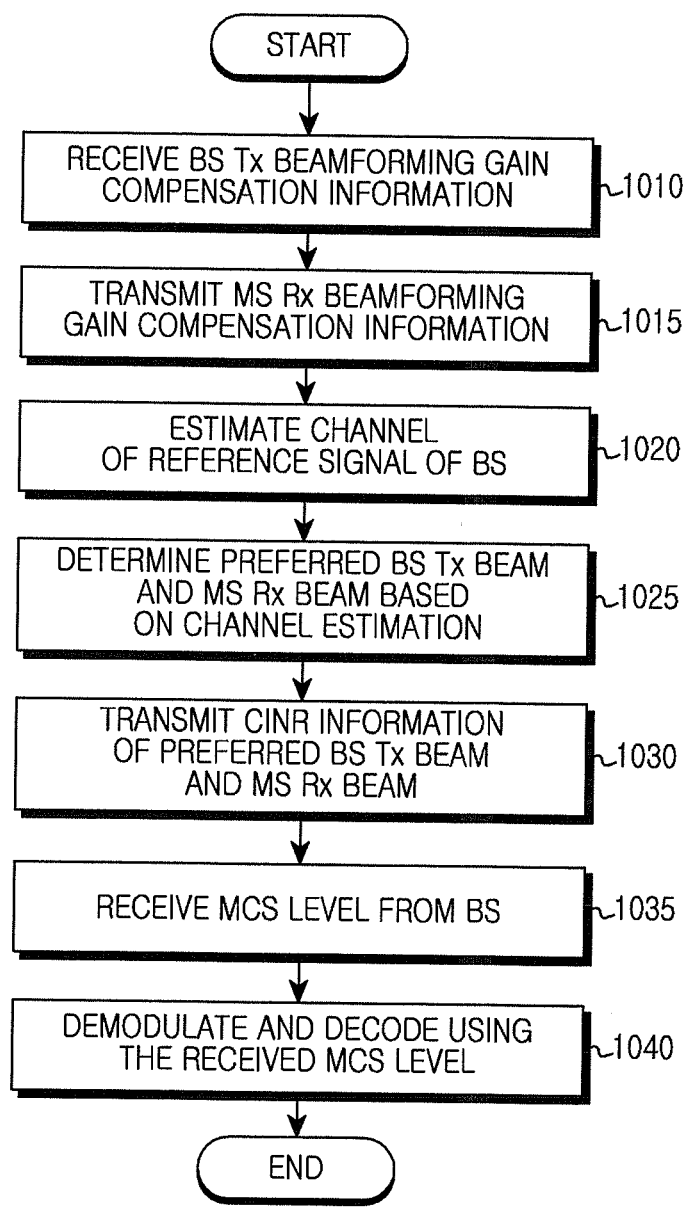
FIG. 10 illustrates operations of the MS when the BS determines the MCS level of the downlink according to an exemplary embodiment of the present disclosure.

FIG. 10 illustrates a flowchart of operations of the MS when the BS determines the MCS level of the downlink according to an exemplary embodiment of the present disclosure.

Referring to FIG. 10, the MS receives the BS Tx beamforming gain compensation information which is broadcast or unicast by the BS in step 1010. The BS Tx beamforming gain compensation information can include the BS Tx support information of the reference signal including the beamwidth/beamforming gain, the BS Tx beam supposition information of the data, and the BS Tx beam pattern.

In step 1015, the MS transmits MS Rx beamforming gain compensation information to the BS. The MS Rx beamforming gain compensation information can include an MS Rx beam pattern including the beamwidth/beamforming gain, MS Rx beam support information of the reference signal, and MS Rx beam supposition information of the data.

Next, the MS estimates the channel of the reference signal of the BS in step 1020, and determines the preferred BS Tx beam and MS Rx beam based on the channel estimation value in step 1025. In so doing, it is assumed that the MS supports the Rx beamforming. When the BS sweeps the Tx beam and the MS sweeps the Rx beam, the MS determines the channel quality of the BS Tx beam and the MS Rx beam and determines the BS Tx beam and the MS Rx beam of the best channel quality as the preferred BS Tx beam and MS Rx beam.

In step 1030, the MS transmits the CINR information of the preferred BS Tx beam and MS Rx beam, to the BS.

Next, the MS receives the MCS level from the BS in step 1035, and demodulates and decodes the burst data using the received MCS level in step 1040.

Next, the MS finishes this process.

Figure 11:
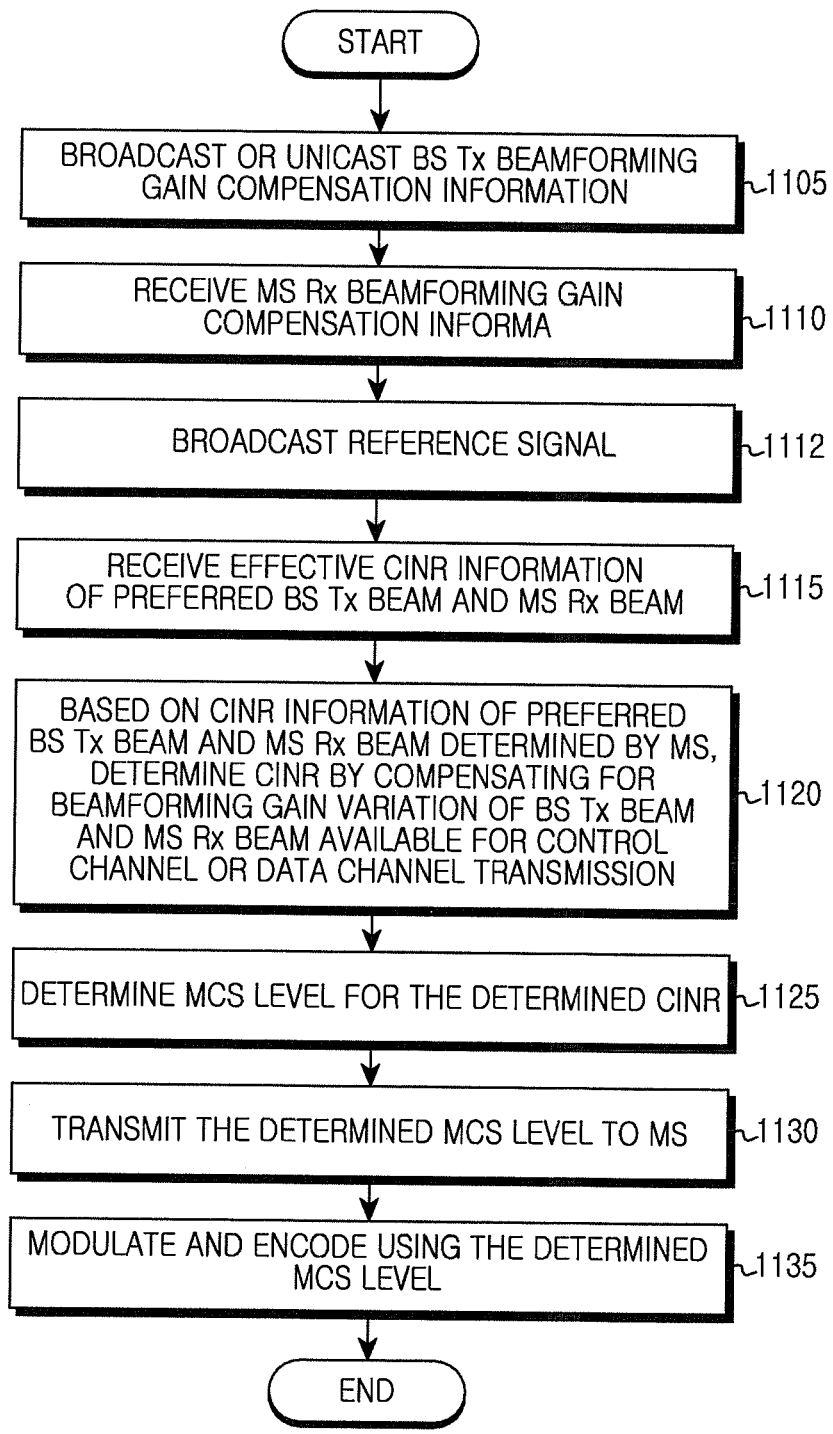
FIG. 11 illustrates operations of the BS for determining the MCS level of the downlink according to an exemplary embodiment of the present disclosure.

FIG. 11 illustrates a flowchart of operations of the BS for determining the MCS level of the downlink according to an exemplary embodiment of the present disclosure.

Referring to FIG. 11, the BS broadcasts or unicasts the BS Tx beamforming gain information in step 1105. The BS Tx beamforming gain information can include the BS Tx support information of the reference signal including the beamwidth/beamforming gain, the BS Tx beam supposition information of the data, and the BS Tx beam pattern.

In step 1110, the BS receives the MS Rx beamforming gain compensation information from the MS. The MS Rx beamforming gain compensation information can include the MS Rx beam pattern including the beamwidth/beamforming gain, the MS Rx beam support information of the reference signal, and the MS Rx beam supposition information of the data.

In step 1112, the BS broadcasts the reference signal. With the reference signal, the MS can estimate the channel and determine the BS Tx beam and the MS Rx beam of the best channel quality as the preferred BS Tx beam and MS Rx beam.

In step 1115, the BS receives the CINR information of the preferred BS Tx beam and MS Rx beam of the MS, from the MS.

In step 1120, based on the CINR information of the preferred BS Tx beam and MS Rx beam, the BS determines the CINR by compensating for the beamforming gain variation of the BS Tx beam and the MS Rx beam which can be used to send the control channel or the data channel.

In step 1125, the BS determines the MCS level for the determined CINR.

In step 1130, the BS transmits the determined MCS level_to the MS.

In step 1135, the BS modulates and encodes the downlink burst using the determined MCS level.

Next, the BS finishes this process.

Figure 12:
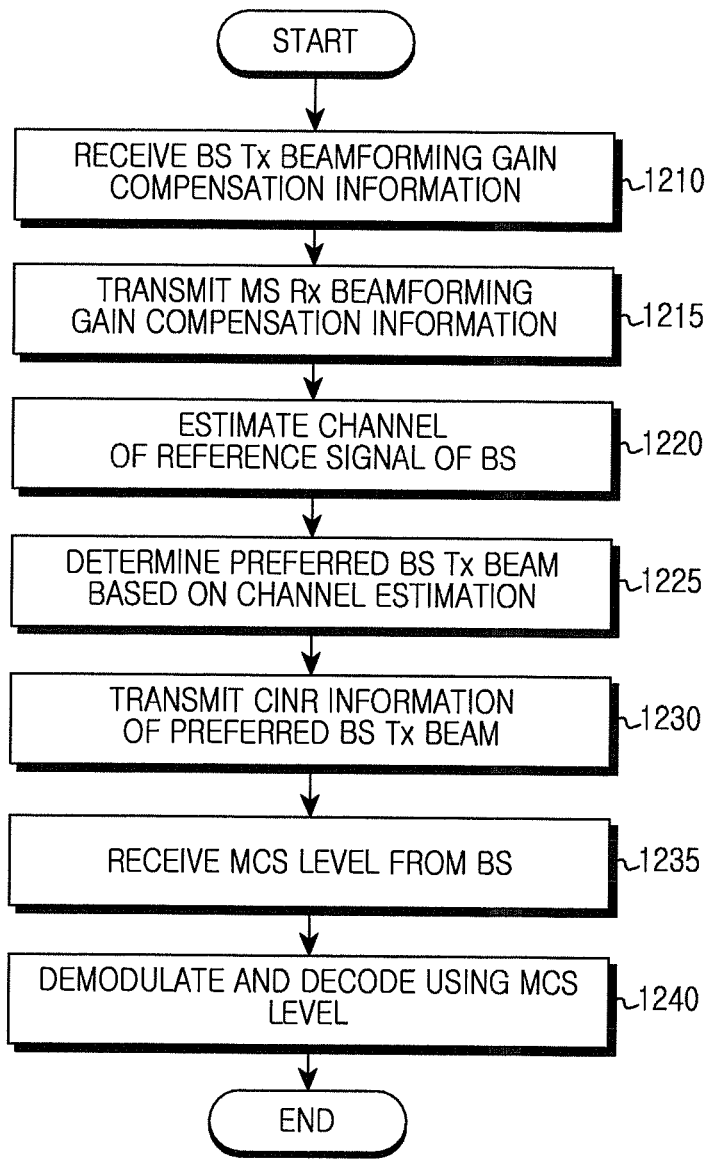
FIG. 12 illustrates operations of the MS when the BS determines the MCS level of the downlink according to an exemplary embodiment of the present disclosure.

FIG. 12 illustrates a flowchart of operations of the MS when the BS determines the MCS level of the downlink according to an exemplary embodiment of the present disclosure.

Referring to FIG. 12, the MS receives the BS Tx beamforming gain compensation information which is broadcast or unicast by the BS in step 1210. The BS Tx beamforming gain compensation information can include the BS Tx support information of the reference signal including the beamwidth/beamforming gain, the BS Tx beam supposition information of the data, and the BS Tx beam pattern.

In step 1215, the MS transmits the MS Rx beamforming gain compensation information to the BS. The MS Rx beamforming gain compensation information can include the MS Rx beam pattern including the beamwidth/beamforming gain, the MS Rx beam support information of the reference signal, and the MS Rx beam supposition information of the data.

Next, the MS estimates the channel of the reference signal of the BS in step 1220, and determines the preferred BS Tx beam based on the channel estimation value in step 1225. When the BS sweeps the Tx beam, the MS determines the channel quality of the BS Tx beam and determines the BS Tx beam of the best channel quality as the preferred BS Tx beam.

In step 1230, the MS transmits the CINR information of the preferred BS Tx beam, to the BS.

Next, the MS receives the MCS level from the BS in step 1235, and demodulates and decodes the burst data using the received MCS level in step 1240.

Next, the MS finishes this process.

Figure 13:
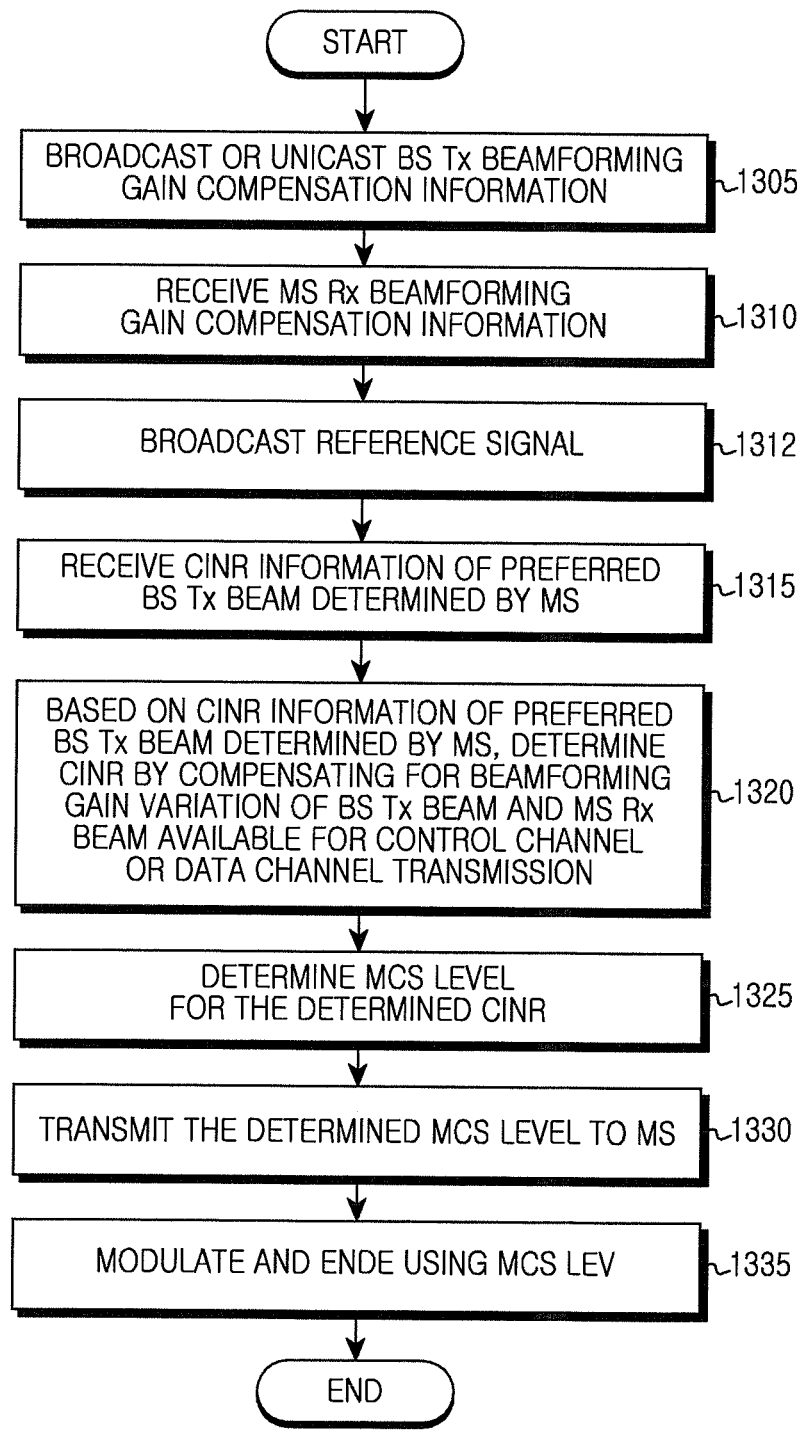
FIG. 13 illustrates operations of the BS for determining the MCS level of the downlink according to an exemplary embodiment of the present disclosure.

FIG. 13 illustrates a flowchart of operations of the BS for determining the MCS level of the downlink according to an exemplary embodiment of the present disclosure.

Referring to FIG. 13, the BS broadcasts or unicasts the BS Tx beamforming gain information in step 1305. The BS Tx beamforming gain compensation information can include the BS Tx support information of the reference signal including the beamwidth/beamforming gain, the BS Tx beam supposition information of the data, and the BS Tx beam pattern.

In step 1310, the BS receives the MS Rx beamforming gain compensation information from the MS. The MS Rx beamforming gain compensation information can include the MS Rx beam pattern including the beamwidth/beamforming gain, the MS Rx beam support information of the reference signal, and the MS Rx beam supposition information of the data.

In step 1312, the BS broadcasts the reference signal. With the reference signal, the MS can estimate the channel and determine the BS Tx beam of the best channel quality as the preferred BS Tx beam.

In step 1315, the BS receives the CINR information of the preferred BS Tx beam of the MS, from the MS.

In step 1320, based on the CINR information of the preferred BS Tx beam and a particular MS Rx beam, the BS determines the CINR by compensating for the beamforming gain variation of the BS Tx beam and the MS Rx beam which can be used to send the control channel or the data channel.

In step 1325, the BS determines the MCS level for the determined CINR.

In step 1330, the BS transmits the determined MCS level to the MS.

In step 1335, the BS modulates and encodes the downlink burst using the determined MCS level.

Next, the BS finishes this process.

Figure 14:
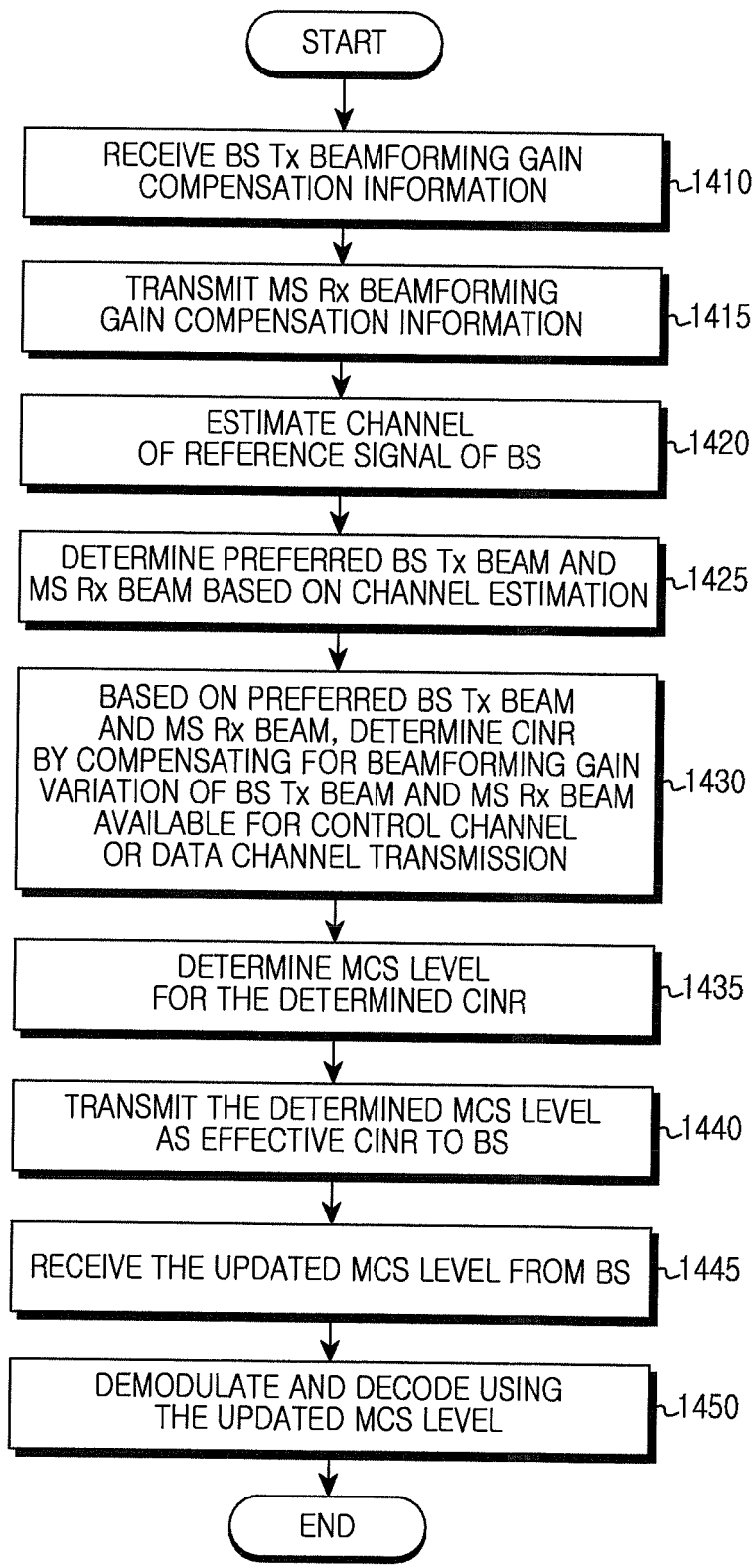
FIG. 14 illustrates operations of the MS when the MS and the BS determine the MCS level of the downlink according to an exemplary embodiment of the present disclosure.

FIG. 14 illustrates a flowchart of operations of the MS when the MS and the BS determine the MCS level of the downlink according to an exemplary embodiment of the present disclosure.

Referring to FIG. 14, the MS receives the BS Tx beamforming gain compensation information which is broadcast or unicast by the BS in step 1410. The BS Tx beamforming gain compensation information can include the BS Tx support information of the reference signal including the beamwidth/beamforming gain, the BS Tx beam supposition information of the data, and the BS Tx beam pattern.

In step 1415, the MS transmits the MS Rx beamforming gain compensation information to the BS. The MS Rx beamforming gain compensation information can include the MS Rx beam pattern including the beamwidth/beamforming gain, the MS Rx beam support information of the reference signal, and the MS Rx beam supposition information of the data.

Next, the MS estimates the channel of the reference signal of the BS in step 1420, and determines the preferred BS Tx beam and MS Rx beam based on the channel estimation value in step 1425. In so doing, it is assumed that the MS supports the Rx beamforming. When the BS sweeps the Tx beam and the MS sweeps the Rx beam, the MS determines the channel quality of the BS Tx beam and the MS Rx beam and determines the BS Tx beam and the MS Rx beam of the best channel quality as the preferred BS Tx beam and MS Rx beam.

In step 1430, based on the preferred BS Tx beam and MS Rx beam, the MS determines the CINR by compensating for the beamforming gain variation of the BS Tx beam and the MS Rx beam which can be used to send the control channel or the data channel.

In step 1435, the MS determines the MCS level for the determined CINR.

In step 1440, the MS transmits the determined MCS level as the effective CINR to the BS.

Next, the MS receives the updated MCS level from the BS in step 1445, and demodulates and decodes the burst data using the updated MCS level in step 1450.

Next, the MS finishes this process.

Figure 15:
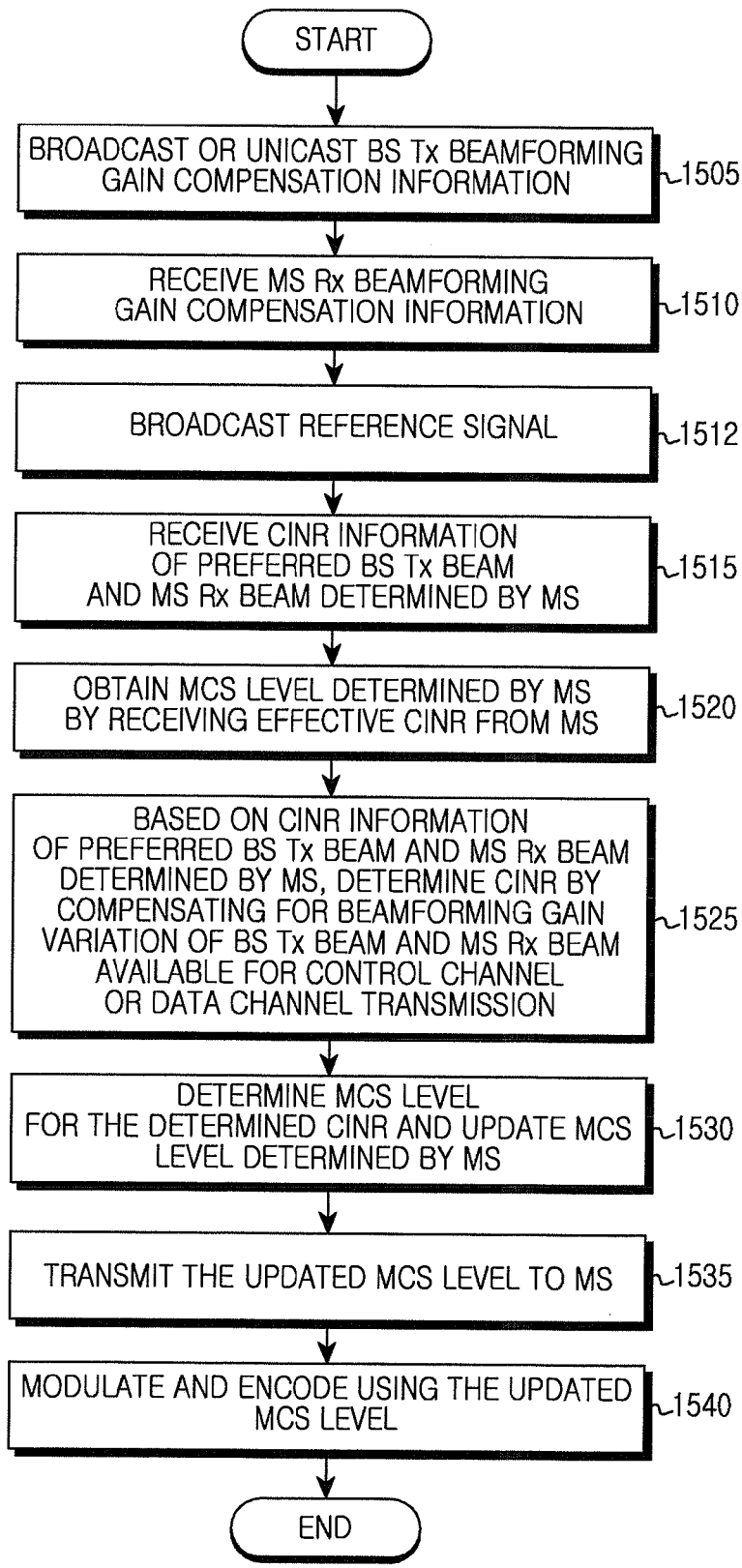
FIG. 15 illustrates operations of the BS when the MS and the BS determine the MCS level of the downlink according to an exemplary embodiment of the present disclosure.

FIG. 15 illustrates a flowchart of operations of the BS when the MS and the BS determine the MCS level of the downlink according to an exemplary embodiment of the present disclosure.

Referring to FIG. 15, the BS broadcasts or unicasts the BS Tx beamforming gain information in step 1505. The BS Tx beamforming gain compensation information can include the BS Tx support information of the reference signal including the beamwidth/beamforming gain, the BS Tx beam supposition information of the data, and the BS Tx beam pattern.

In step 1510, the BS receives the MS Rx beamforming gain compensation information from the MS. The MS Rx beamforming gain compensation information can include the MS Rx beam pattern including the beamwidth/beamforming gain, the MS Rx beam support information of the reference signal, and the MS Rx beam supposition information of the data.

In step 1512, the BS broadcasts the reference signal. With the reference signal, the MS can estimate the channel and determine the BS Tx beam and the MS Rx beam of the best channel quality as the preferred BS Tx beam and MS Rx beam.

In step 1515, the BS receives the CINR information of the preferred BS Tx beam and MS Rx beam determined by the MS, from the MS. In step 1520, the BS can obtain the MCS level determined by the MS by receiving the effective CINR from the MS.

In step 1525, based on the CINR information of the preferred BS Tx beam and MS Rx beam, the BS determines the CINR by compensating for the beamforming gain variation of the BS Tx beam and the MS Rx beam which can be used to send the control channel or the data channel.

In step 1530, the BS determines the MCS level for the determined CINR and updates the MCS level of the effective CINR received from the MS.

In step 1535, the BS transmits the updated MCS level to the MS.

In step 1540, the BS modulates and encodes the downlink burst using the updated MCS level.

Next, the BS finishes this process.

Figure 16:
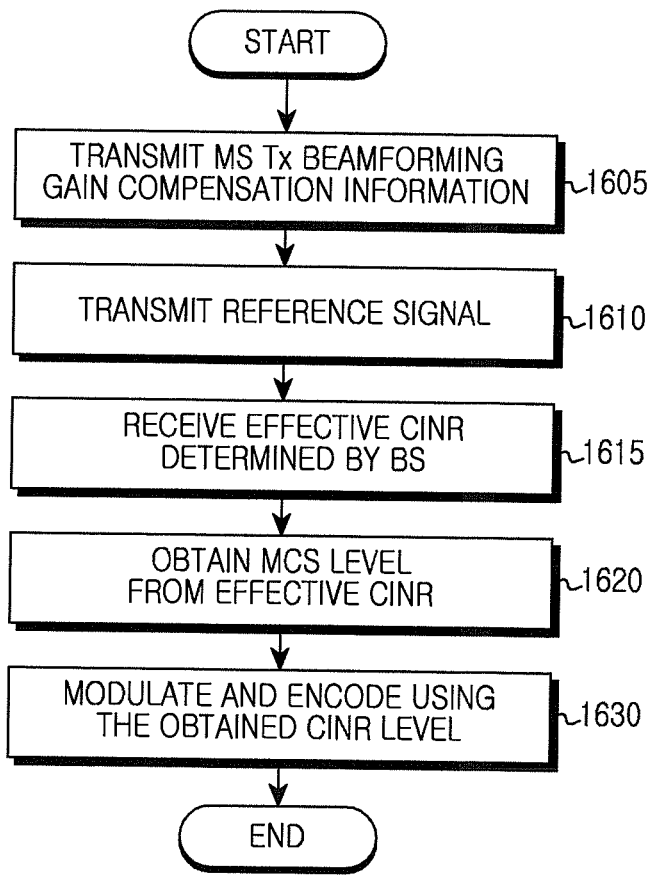
FIG. 16 illustrates operations of the MS when the BS determines the MCS level of the uplink according to an exemplary embodiment of the present disclosure.

FIG. 16 illustrates a flowchart of operations of the MS when the BS determines the MCS level of the uplink according to an exemplary embodiment of the present disclosure.

Referring to FIG. 16, the MS transmits the MS Tx beamforming gain compensation information to the BS in step 1605. The MS Tx beamforming gain compensation information can include the MS Tx beam support information of the reference signal including the beamwidth/beamforming gain, the MS Tx beam supposition information of the data, and the MS Tx beam pattern.

In step 1610, the MS transmits the reference signal.

In step 1615, the MS receives the effective CINR determined by the BS.

In step 1620, the MS obtains the MCS level from the effective CINR.

In step 1630, the MS modulates and encodes the uplink burst using the obtained MCS level.

Next, the MS finishes this process.

Figure 17:
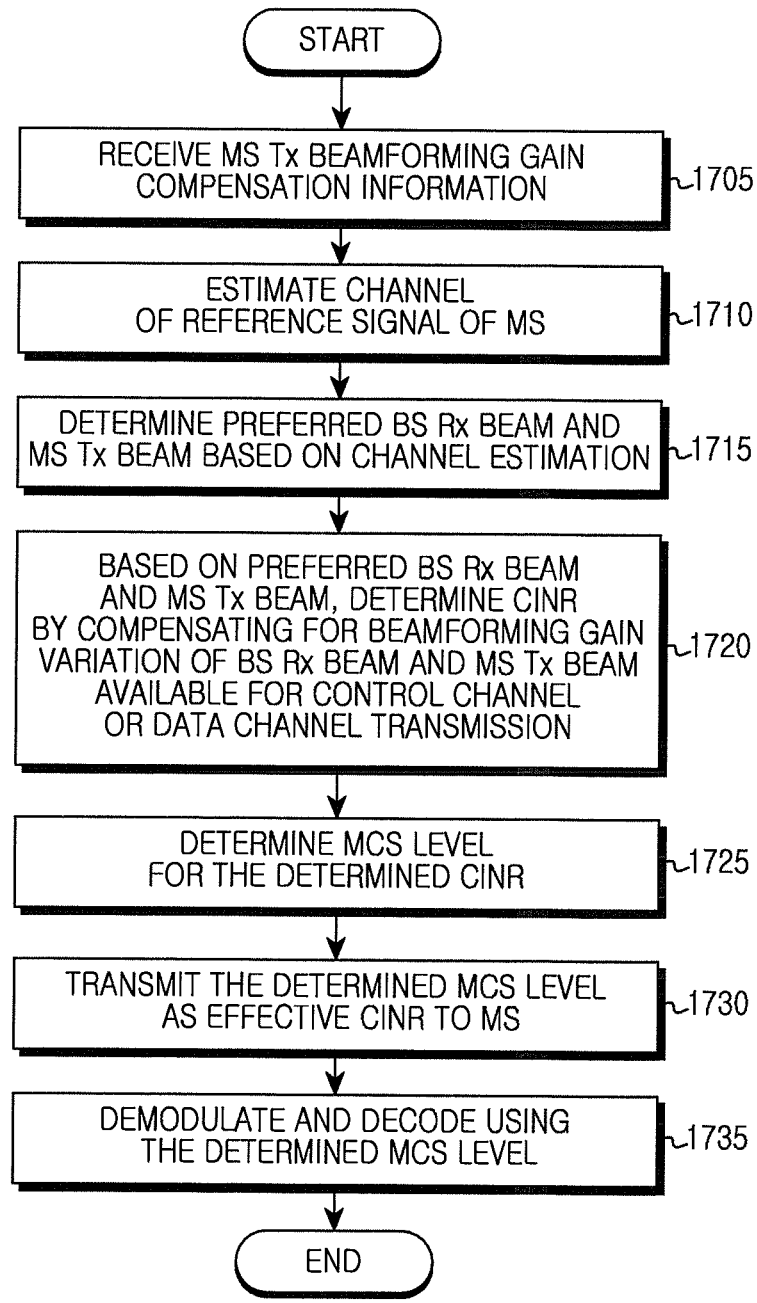
FIG. 17 illustrates operations of the BS for determining the MCS level of the uplink according to an exemplary embodiment of the present disclosure.

FIG. 17 illustrates a flowchart of operations of the BS for determining the MCS level of the uplink according to an exemplary embodiment of the present disclosure.

Referring to FIG. 17, the BS receives the MS Tx beamforming gain compensation information in step 1705. The MS Tx beamforming gain compensation information can include the MS Tx beam support information of the reference signal including the beamwidth/beamforming gain, the MS Tx beam supposition information of the data, and the MS Tx beam pattern.

Next, the BS estimates the channel of the reference signal of the MS in step 1710, and determines the preferred BS Rx beam and MS Tx beam in step 1715.

When the MS sweeps the Tx beam and the BS sweeps the Rx beam, the BS determines the channel quality of the BS Rx beam and the MS Tx beam and determines the BS Rx beam and the MS Tx beam of the best channel quality as the preferred BS Rx beam and MS Tx beam.

In step 1720, based on the preferred BS Rx beam and MS Tx beam determined, the BS determines the CINR by compensating for the beamforming gain variation of the BS Rx beam and the MS Tx beam which can be used to send the control channel or the data channel.

In step 1725, the BS determines the MCS level for the determined CINR.

In step 1730, the BS transmits the determined MCS level as the effective CINR to the MS.

In step 1735, the BS modulates and encodes the uplink burst using the determined MCS level.

Next, the BS finishes this process.

As set forth above, in the beamforming based system for transmitting and receiving the downlink in one or more beam patterns of the different beamwidths and beamforming gains, the method and the apparatus for effectively operating the beamforming by considering the beamforming gain difference according to the different Tx/Rx beam patterns can enhance the transmission/reception performance and achieve the effective beamforming.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

What is claimed is:

1. A method operating of a mobile station (MS) in a wireless communication system using beamforming, the method comprising:

receiving beamforming gain compensation information from a base station;

receiving a reference signal over a plurality of downlink transmit (Tx) beams of the base station;

measuring channel quality based on the received reference signal; and determining effective channel quality information based on the beamforming gain compensation information and the measured channel quality, wherein the beamforming gain compensation information comprises a difference between a first beamforming gain for the reference signal and a second beamforming gain for data transmission.

2. The method of claim 1, wherein determining the effective channel quality information comprises:

acquiring the second beamforming gain for the data transmission by compensating the first beamforming gain for the reference signal corresponding to the measured channel quality based on the beamforming gain compensation information; and determining the effective channel quality information based on the second beamforming gain, wherein the second beamforming gain is used to transmit a control channel or a data channel.

3. The method of claim 1, further comprising:

transmitting the determined effective channel quality information to the base station (BS).

4. The method of claim 1, wherein the effective channel quality information comprises a modulation and coding (MCS) level.

5. A method operating of a base station (BS) in a wireless communication system using beamforming, the method comprising:

transmitting beamforming gain compensation information to a mobile station;

transmitting a reference signal using a plurality of downlink transmit (Tx) beams; and receiving effective channel quality information which is determined based on the beamforming gain compensation information and the reference signal, wherein the beamforming gain compensation information comprises difference between a first beamforming gain for the reference signal and a second beamforming gain for data transmission.

6. The method of claim 5, wherein the effective channel quality information further comprises a modulation and coding scheme (MCS) level.

7. The method of claim 5, wherein the second beamforming gain is used to transmit a control channel or a data channel.

8. An apparatus of a mobile station (MS) in a wireless communication system using beamforming, the apparatus comprising:

a receiver configured to receive beamforming gain compensation information from a base station, and receive a reference signal over a plurality of downlink transmit (Tx) beams of the base station; and a controller configured to measure channel quality based on the received reference signal, and determine effective channel quality information based on the beamforming gain compensation information and the measured channel quality, wherein the beamforming gain compensation information comprises difference between a first beamforming gain for the reference signal and a second beamforming gain for data transmission.

9. The apparatus of claim 8, wherein the controller is configured to acquire the second beamforming gain for the data transmission by compensating the first beamforming gain for the reference signal corresponding to the measured channel quality based on the beamforming gain compensation information; and determine the effective channel quality information based on the second beamforming gain, wherein the second beamforming gain is used to transmit a control channel or a data channel.

10. The apparatus of claim 8, further comprising:

a transmitter configured to transmit the determined effective channel quality information to the base station (BS).

11. The apparatus of claim 8, wherein, when the effective channel quality information comprises a modulation and coding scheme (MCS) level.

12. An apparatus of a base station (BS) in a wireless communication system using beamforming, the apparatus comprising:

a transmitter configured to transmit beamforming gain compensation information to a mobile station, and transmit a reference signal using a plurality of downlink transmit (Tx) beams; and a receiver configured to receive effective channel quality information, and wherein the beamforming gain compensation information comprise a difference between a first beamforming gain for the reference signal and a second beamforming gain for data transmission.

13. The apparatus of claim 12, wherein the effective channel quality information further comprises a modulation and coding scheme (MCS) level.

14. The apparatus of claim 12, wherein the second beamforming gain is used to transmit a control channel or a data channel.

* * * * *